United States Patent
Tamatani et al.

(10) Patent No.: US 12,217,916 B2
(45) Date of Patent: Feb. 4, 2025

(54) ELECTRONIC COMPONENT AND METHOD FOR MANUFACTURING ELECTRONIC COMPONENT

(71) Applicant: Murata Manufacturing Co., Ltd., Nagaokakyo (JP)

(72) Inventors: Yasuhiro Tamatani, Nagaokakyo (JP); Kazuya Kusuda, Nagaokakyo (JP)

(73) Assignee: MURATA MANUFACTURING CO., LTD., Nagaokakyo (JP)

( * ) Notice: Subject to any disclaimer, the term of this patent is extended or adjusted under 35 U.S.C. 154(b) by 135 days.

(21) Appl. No.: 18/065,917

(22) Filed: Dec. 14, 2022

(65) Prior Publication Data

US 2023/0119320 A1  Apr. 20, 2023

Related U.S. Application Data

(63) Continuation of application No. PCT/JP2021/022437, filed on Jun. 14, 2021.

(30) Foreign Application Priority Data

Jun. 16, 2020  (JP) ................................ 2020-103933

(51) Int. Cl.
*H01G 9/012* (2006.01)
*H01G 4/232* (2006.01)
(Continued)

(52) U.S. Cl.
CPC ............. *H01G 9/012* (2013.01); *H01G 4/232* (2013.01); *H01G 9/0029* (2013.01); *H01G 4/30* (2013.01)

(58) Field of Classification Search
None
See application file for complete search history.

(56) References Cited

U.S. PATENT DOCUMENTS

| 2003/0026064 A1* | 2/2003 | Nakada | ................. H01G 9/15 |
| | | | 361/523 |
| 2010/0202098 A1* | 8/2010 | Yanagida | ............... H01G 4/30 |
| | | | 361/321.1 |

(Continued)

FOREIGN PATENT DOCUMENTS

| JP | 86477916 A | 3/1989 |
| JP | 2012004480 A | 1/2012 |

(Continued)

OTHER PUBLICATIONS

International Search Report in PCT/JP2021/022437, mailed Aug. 10, 2021, 3 pages.

*Primary Examiner* — Eric W Thomas
(74) *Attorney, Agent, or Firm* — ArentFox Schiff LLP

(57) ABSTRACT

An electronic component including a base body including a first end surface and a second end surface opposite to each other in a length direction, a first internal electrode exposed at the first end surface, and a second internal electrode exposed at the second end surface; a first external electrode on the first end surface and connected to the first internal electrode; and a second external electrode on the second end surface and connected to the second internal electrode. The first external electrode includes a resin electrode layer containing a conductive component and a resin component, the resin electrode layer of the first external electrode includes a first portion facing a whole surface of the first end surface of the base body, and a plurality of protrusions are arranged periodically side by side on a surface of the first portion of the resin electrode layer of the first external electrode.

18 Claims, 5 Drawing Sheets

(51) Int. Cl.
*H01G 9/00* (2006.01)
*H01G 4/30* (2006.01)

(56) References Cited

U.S. PATENT DOCUMENTS

| | | |
|---|---|---|
| 2015/0136463 A1 | 5/2015 | Lee et al. |
| 2016/0189866 A1 | 6/2016 | Kitamura et al. |
| 2018/0301283 A1 | 10/2018 | Tomizawa et al. |
| 2018/0323010 A1* | 11/2018 | Park ................. H01G 2/065 |
| 2019/0244765 A1 | 8/2019 | Harada et al. |

FOREIGN PATENT DOCUMENTS

| | | |
|---|---|---|
| JP | 2015097248 A | 5/2015 |
| JP | 2018182039 A | 11/2018 |
| WO | 2015037394 A1 | 3/2015 |
| WO | 2018074408 A1 | 4/2018 |

* cited by examiner

ELECTRONIC COMPONENT AND METHOD FOR MANUFACTURING ELECTRONIC COMPONENT

CROSS REFERENCE TO RELATED APPLICATIONS

The present application is a continuation of International application No. PCT/JP2021/022437, filed Jun. 14, 2021, which claims priority to Japanese Patent Application No. 2020-103933, filed Jun. 16, 2020, the entire contents of each of which are incorporated herein by reference.

FIELD OF THE INVENTION

The present invention relates to an electronic component and a method of producing an electronic component.

BACKGROUND OF THE INVENTION

A material in which an external electrode is provided on a surface of a base body including an internal electrode is used as an electronic component.

For example, Patent Literature 1 discloses an external electrode forming method for an electronic component in which a conductive paste is printed on a material to be printed through a metal mask configured by a hole portion and a mesh portion which is arranged so as to surround the outer periphery of the hole portion, the outer periphery of the hole portion of the metal mask being located inside a printing region of the material to be printed, and the outer periphery of the mesh portion being located outside the printing region of the material to be printed.

Patent Literature 2 discloses a method of producing an electronic component including a base body including a pair of end surfaces opposite to each other, a pair of main surfaces which extend so as to connect the pair of end surfaces to each other and are opposite to each other, and a pair of side surfaces which extend so as to connect the pair of main surfaces and are opposite to each other, and external electrode formed on the end surface side of the base body, the method including preparing a base body including curved surfaces obtained by curving corner portions defined by the end surfaces, the main surfaces and the side surfaces, forming a first paste layer by screen-printing a first conductive paste on the end surfaces and the curved surfaces to form a first paste layer, and forming a second paste layer by screen-printing a second conductive paste on one or both surfaces of either one of the main surfaces and the side surfaces and the curved surfaces to form a second paste layer, wherein in the forming a first paste layer or the forming a second paste layer, the first paste layer or the second paste layer is formed so that the first paste layer and the second paste layer are joined to each other on the curved surfaces.

Patent Literature 1: International Publication NO. WO 2015/037394
Patent Literature 2: JP 2012-4480 A

SUMMARY OF THE INVENTION

In the external electrode forming method for an electronic component described in paragraph [0031] of Patent Literature 1, by printing a conductive paste on a material to be printed, the conductive paste which has passed through the mesh portion and the hole portion is leveled to be brought into a thin film state, and then dried and fired to form external electrode.

In the method of producing an electronic component described in paragraph [0045] of Patent Literature 2, although unevenness caused by sintering of conductive metal particles occurs on the surfaces of a first baked electrode and a second baked electrode formed by baking the first paste layer and the second paste layer, a plating layer is formed so as to cover the unevenness on the first baked electrode and the second baked electrode, whereby minute unevenness of the first baked electrode and the second baked electrode are filled with the plating layer.

In other words, in both the external electrode forming method for an electronic component described in Patent Literature 1 and the method of producing an electronic component described in Patent Literature 2, the surface of the external electrode is smoothed. However, if the surface of the external electrode is smoothed, the contact area between the external electrode and a conductive bonding material such as solder is less likely to increase when the electronic component is mounted on a wiring board via the conductive bonding material, which causes a problem that it is difficult to enhance the adhesion between the external electrode and the conductive bonding material.

The present invention was made to solve the above issue, and aims to provide an electronic component in which the adhesion between an external electrode and a conductive bonding material such as solder is enhanced when the electronic component is mounted on a wiring board via the conductive bonding material. The present invention also aims to provide a method of producing the electronic component.

An electronic component of the present invention includes: a base body which includes a first end surface and a second end surface opposite to each other in a length direction, a first main surface and a second main surface opposite to each other in a thickness direction perpendicular to the length direction, and a first side surface and a second side surface opposite to each other in a width direction perpendicular to the length direction and the thickness direction, a first internal electrode exposed at the first end surface, and a second internal electrode exposed at the second end surface; a first external electrode on the first end surface and connected to the first internal electrode; and a second external electrode on the second end surface and connected to the second internal electrode, wherein the first external electrode includes a first resin electrode layer containing a conductive component and a resin component, the first resin electrode layer of the first external electrode includes a first portion facing a whole surface of the first end surface of the base body, and a first plurality of protrusions are arranged periodically side by side on a surface of the first portion of the first resin electrode layer of the first external electrode, the surface of the first portion being opposite to the first end surface of the base body.

A method of producing an electronic component of the present invention includes: forming a base body which includes a first end surface and a second end surface opposite to each other in a length direction, a first main surface and a second main surface opposite to each other in a thickness direction perpendicular to the length direction, and a first side surface and a second side surface opposite to each other in a width direction perpendicular to the length direction and the thickness direction, a first internal electrode exposed at the first end surface, and a second internal electrode exposed at the second end surface; forming, on the first end surface of the base body, a first external electrode so as to be connected to the first internal electrode by applying a conductive paste containing a conductive component and a resin component by screen printing to form a first resin electrode layer including a first portion facing a whole surface of the first end surface of the base body so that a first plurality of protrusions are arranged periodically side by side on a surface of the first portion, the surface of the first portion being opposite to the first end surface of the base body; and forming, on the second end surface of the base body, a second external electrode so as to be connected to the second internal electrode.

The present invention can provide an electronic component in which the adhesion between an external electrode and a conductive bonding material such as solder is enhanced when the electronic component is mounted on a wiring board via the conductive bonding material. The present invention can also provide a method of producing the electronic component.

DETAILED DESCRIPTION OF THE PREFERRED EMBODIMENTS

Figure 1:
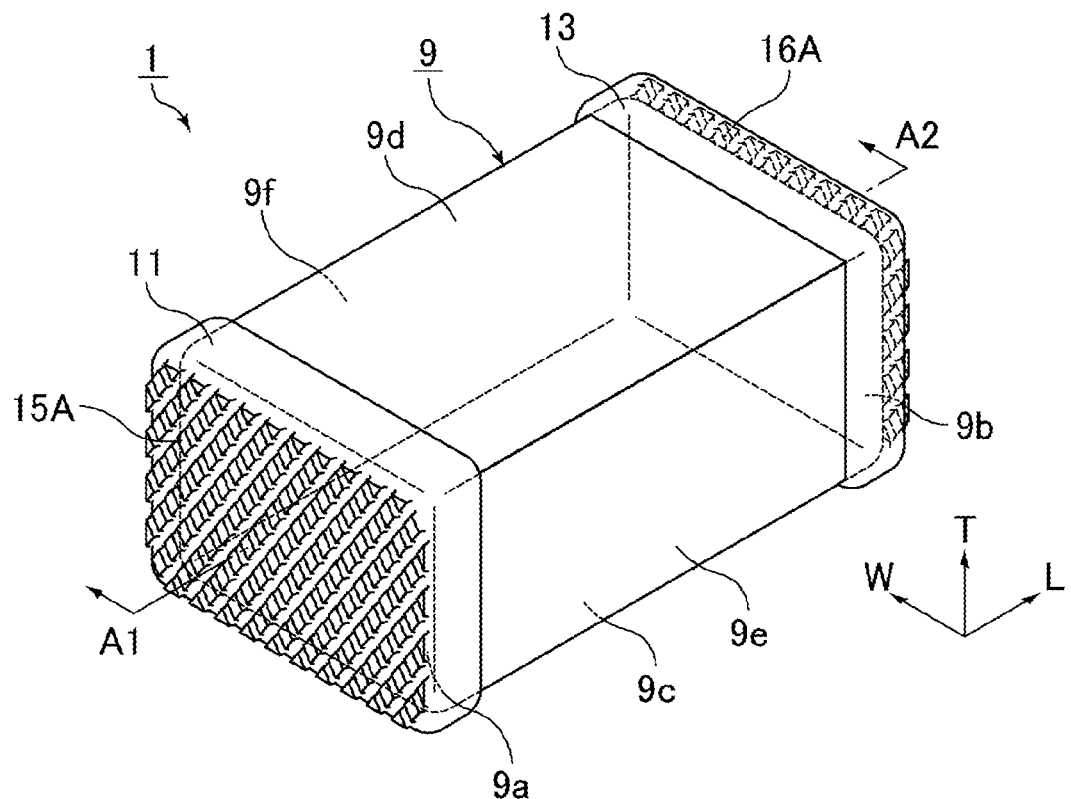
FIG. 1 is a schematic perspective view showing an electronic component of Embodiment 1 of the present invention.

The electronic component of the present invention and the method of producing an electronic component of the present invention are described below. The present invention is not limited to the following preferred embodiments and may be suitably modified without departing from the gist of the present invention. Combinations of preferred features described in the following preferred embodiments are also within the scope of the present invention.

The following embodiments are examples, and features of different embodiments can be partially exchanged or combined with each other. In the second embodiment and subsequent embodiments, a description of features common to the first embodiment is omitted, and only different points are described. In particular, similar effects by similar features are not mentioned in each embodiment. In the following description, the electronic component and the method of producing an electronic component of each embodiment is simply referred to as "the electronic component of the present invention" and "the method of producing an electronic component of the present invention" when no distinction is made between the embodiments.

Embodiment 1

The electronic component of the present invention includes: a base body which includes a first end surface and a second end surface opposite to each other in a length direction, a first main surface and a second main surface opposite to each other in a thickness direction perpendicular to the length direction, and a first side surface and a second side surface opposite to each other in a width direction perpendicular to the length direction and the thickness direction, a first internal electrode exposed at the first end surface, and a second internal electrode exposed at the second surface; a first external electrode on the first end surface and connected to the first internal electrode; and a second external electrode on the second end surface and connected to the second internal electrode, wherein the first external electrode includes a first resin electrode layer containing a conductive component and a resin component, the first resin electrode layer of the first external electrode includes a first portion facing a whole surface of the first end surface of the base body, and a first plurality of protrusions are arranged periodically side by side on a surface of the first portion of the first resin electrode layer of the first external electrode, the surface of the first portion being opposite to the first end surface of the base body.

In the electronic component of the present invention, the base body may be formed of a resin molding including an electrolytic capacitor element, and a sealing resin sealing a periphery of the electrolytic capacitor element, the electrolytic capacitor element may include an anode, a dielectric layer on a surface of the anode, and a cathode facing the anode via the dielectric layer and including an electrolyte layer, and the first internal electrode may be one of the anode or the cathode. Such an electronic component corresponds to an electrolytic capacitor. In the following description, an electrolytic capacitor will be described below as an electronic component of Embodiment 1 of the present invention.

FIG. 1 is a schematic perspective view showing an electronic component of Embodiment 1 of the present invention.

As shown in FIG. 1, the electrolytic capacitor 1 includes a resin molding 9, a first external electrode 11, and a second external electrode 13.

Herein, a length direction, a thickness direction, and a width direction are directions indicated by L, T, and W respectively, as shown in FIG. 1 and elsewhere. Here, the length direction L, the thickness direction T, and the width direction W are perpendicular to one another.

The resin molding 9 corresponds to the base body in the electronic component of the present invention.

The resin molding 9 has a substantially rectangular parallelepiped shape, and includes a first end surface 9a and a second end surface 9b opposite to each other in the length direction L, a first main surface 9c and a second main surface 9d opposite to each other in the thickness direction T, and a first side surface 9e and a second side surface 9f opposite to each other in the width direction W.

The first end surface 9a and the second end face 9b of the resin molding 9 are not required to be strictly perpendicular to the length direction L. Moreover, the first main surface 9c and the second main surface 9d of the resin molding 9 are not required to be strictly perpendicular to the thickness direction T. Furthermore, the first side surface 9e and the second side surface 9f of the resin molding 9 are not required to be strictly perpendicular to the width direction W.

The first external electrode 11 is provided on the first end surface 9a of the resin molding 9. The first external electrode 11 may extend from the first end surface 9a of the resin molding 9 to a part of each surface in at least one surface selected from the group consisting of the first main surface 9c, the second main surface 9d, the first side surface 9e, and the second side surface 9f.

The second external electrode 13 is provided on the second end surface 9b of the resin molding 9. The second external electrode 13 may extend from the second end surface 9b of the resin molding 9 to a part of each surface in at least one surface selected from the group consisting of the first main surface 9c, the second main surface 9d, the first side surface 9e, and the second side surface 9f.

Figure 2:
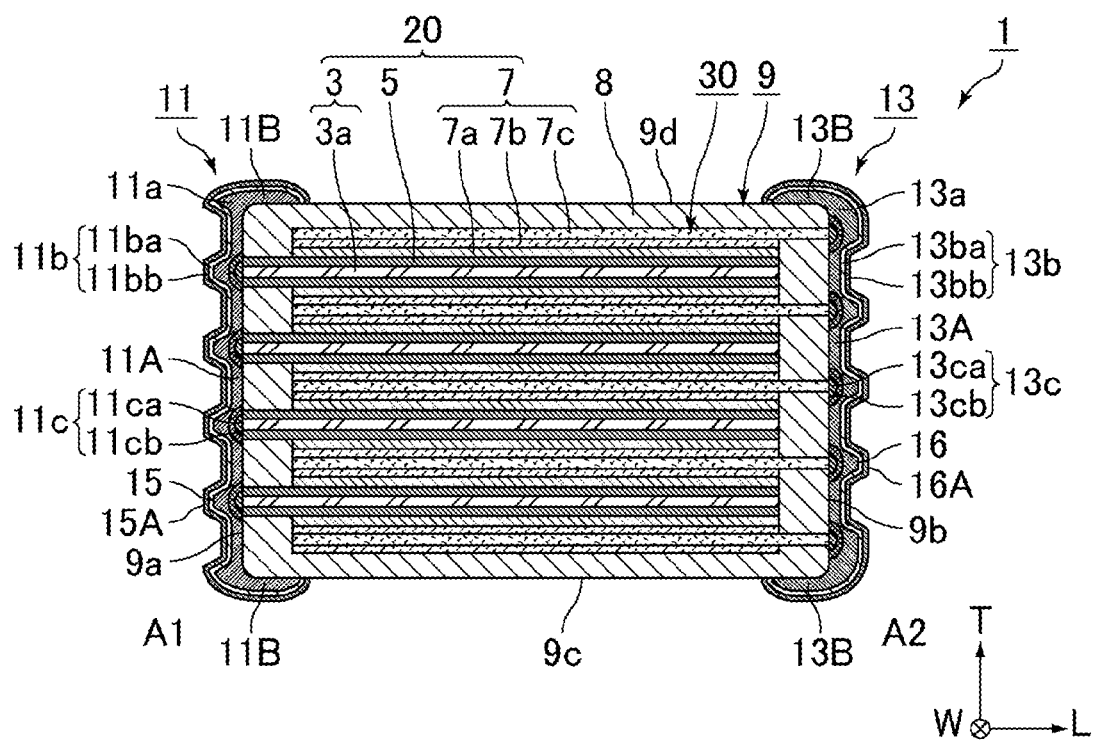
FIG. 2 is a schematic cross-sectional view taken along line A1-A2 in FIG. 1.

FIG. 2 is a schematic cross-sectional view taken along line A1-A2 in FIG. 1.

As shown in FIG. 2, the resin molding 9 includes a plurality of electrolytic capacitor elements 20, and a sealing resin 8 for sealing the peripheries of the plurality of electrolytic capacitor elements 20. More specifically, the resin molding 9 includes a stack 30 in which the plurality of electrolytic capacitor elements 20 are laminated in the thickness direction T, and the sealing resin 8 for sealing the periphery of the stack 30.

In the stack 30, for example, the electrolytic capacitor elements 20 may be bonded to each other via a conductive adhesive called adhesive silver.

It is preferable that the resin molding 9 includes a plurality of electrolytic capacitor elements 20, but it may have one electrolytic capacitor element 20.

A support substrate such as a glass epoxy substrate may be provided at a bottom portion of the resin molding 9. When a support substrate is provided, the bottom surface of the support substrate constitutes the first main surface 9c of the resin molding 9.

The electrolytic capacitor element 20 includes an anode 3, a dielectric layer 5, and a cathode 7.

The anode 3 corresponds to the first internal electrode in the electronic component of the present invention.

The anode 3 includes a valve-action metal substrate 3a at the center thereof, and a porous portion (not shown) at the surface thereof.

Examples of valve-action metal of the valve-action metal substrate 3a include elemental metals such as aluminum, tantalum, niobium, titanium, zirconium, magnesium, and silicon, and alloys containing at least one of these metals. In particular, aluminum and an aluminum alloy are preferred.

The valve-action metal substrate 3a is preferably a flat plate, more preferably foil.

Preferably, the porous portion is an etched layer of the valve-action metal substrate 3a etched with hydrochloric acid or the like.

The thickness of the valve-action metal substrate 3a before etching is preferably 60 μm to 180 μm. After etching, the thickness of the non-etched core of the valve-action metal substrate 3a is preferably 10 μm to 70 μm. The thickness of the porous portion is designed according to the withstand voltage and capacitance required for the electrolytic capacitor 1. In the cross section shown in FIG. 2, the total thickness of the porous portions on both sides of the valve-action metal substrate 3a is preferably 10 μm to 120 μm. The porous portion may be on one of main surfaces of the valve-action metal substrate 3a.

The anode 3 is exposed at the first end surface 9a of the resin molding 9, and connected to the first external electrode 11.

The dielectric layer 5 is provided on a surface of the anode 3. More specifically, the dielectric layer 5 is provided on a surface of the porous portion.

Preferably, the dielectric layer 5 is made of an oxide film of the valve-action metal. For example, when the valve-action metal substrate 3a is aluminum foil, the valve-action metal substrate 3a is anodized in an aqueous solution containing boric acid, phosphoric acid, adipic acid, a sodium salt or an ammonium salt thereof, or the like, whereby an oxide film that turns into the dielectric layer 5 is formed. The dielectric layer 5 is formed along the surface of the porous portion, whereby pores (recesses) are formed in the dielectric layer 5.

The thickness of the dielectric layer 5 is designed according to the withstand voltage, capacitance, and the like required for the electrolytic capacitor 1. The thickness is preferably 10 nm to 100 nm.

The cathode 7 corresponds to the second internal electrode in the electronic component of the present invention.

The cathode 7 is opposite to the anode 3 via the dielectric layer 5.

The cathode 7 includes an electrolyte layer. More specifically, the cathode 7 includes a solid electrolyte layer 7a on a surface of the dielectric layer 5 as the electrolyte layer. The electrolytic capacitor 1 includes the solid electrolyte layer 7a, and is thus regarded as a solid electrolytic capacitor.

The electrolytic capacitor 1 may be an electrolytic capacitor including an electrolytic solution instead of a solid electrolyte, or may be an electrolytic capacitor including a solid electrolyte and an electrolytic solution.

Examples of constituent materials of the solid electrolyte layer 7a include a conductive polymer having a pyrrole, thiophene, or aniline skeleton. A conductive polymer having a thiophene skeleton is, for example, poly(3,4-ethylenedioxythiophene) (PEDOT), and may be PEDOT:PSS which is a complex with (poly(styrene sulfonate) (PSS)) as a dopant.

The solid electrolyte layer 7a is formed by, for example, a method in which a polymerized film of poly(3,4-ethylenedioxythiophene) or the like is formed on the surface of the dielectric layer 5 using a treatment liquid containing a monomer such as 3,4-ethylenedioxythiophene, or a method in which a dispersion of a polymer such as poly(3,4-ethylenedioxythiophene) is applied to the surface of the dielectric layer 5 and then dried. The solid electrolyte layer 7a is formed in a predetermined region by applying the treatment liquid or dispersion to the surface of the dielectric layer 5 by a method such as screen printing, sponge transfer printing, inkjet printing, immersion coating, dispenser coating, or spray coating. Preferably, the solid electrolyte layer 7a is obtained by first forming a solid electrolyte layer for an inner layer for filling the pores (recesses) of the dielectric layer 5 and then forming a solid electrolyte layer for an outer layer for covering the entire dielectric layer 5.

The thickness of the solid electrolyte layer 7a is preferably 2 μm to 20 μm.

Preferably, the cathode 7 further includes a conductive layer 7b on a surface of the solid electrolyte layer 7a.

The conductive layer 7b is formed by applying a conductive paste such as a carbon paste, a graphene paste, or a silver paste to a surface of the solid electrolyte layer 7a by a method such as screen printing, sponge transfer printing, inkjet printing, immersion coating, dispenser coating, or spray coating.

Preferably, the conductive layer 7b is a carbon layer, a graphene layer, or a silver layer formed as described above. The conductive layer 7b may be a composite layer in which a silver layer is disposed on a carbon layer or a graphene layer, or a mixed layer containing a mixture of a carbon paste or a graphene paste with a silver paste.

The thickness of the conductive layer 7b is preferably 2 µm to 20 µm.

The cathode 7 may further include a cathode lead-out layer 7c on a surface of the conductive layer 7b.

The cathode lead-out layer 7c is made of metal foil, a resin electrode layer, or the like, for example.

When the cathode lead-out layer 7c is metal foil, the metal foil is preferably made of at least one metal selected from the group consisting of aluminum, copper, silver, and an alloy containing at least one of these metals as a main component. When the metal foil is made of the metal described above, the resistance of the metal foil decreases, so that ESR (equivalent series resistance) of the electrolytic capacitor 1 tends to be low.

As the metal foil may be used, for example, metal foil whose surface is coated with a carbon coat, a titanium coat, or the like by a film forming method such as sputtering or vapor deposition. Carbon-coated aluminum foil is preferably used.

The thickness of the metal foil is preferably 20 µm to 50 µm, from the viewpoints of enhancement in handling performance in the manufacturing process, miniaturization, and reduction of ESR.

When the cathode lead-out layer 7c is a resin electrode layer, the resin electrode layer is formed, for example, by applying a conductive paste containing a conductive component and a resin component to the surface of the conductive layer 7b by a method such as screen printing, sponge transfer printing, inkjet printing, immersion coating, dispenser coating, or spray coating.

The conductive paste to be used for forming the cathode lead-out layer 7c preferably contains silver, copper, or nickel as a main component of the conductive component.

When the cathode lead-out layer 7c is formed by the printing method as described above, it can be formed to be thinner than the metal foil. For example, when the cathode lead-out layer 7c is formed by screen printing, the thickness thereof can be set to 20 µm or less.

The cathode lead-out layer 7c is preferably formed on the surface of the conductive layer 7b in a state where the conductive layer 7b is viscous before drying.

The cathode 7 (here, the cathode lead-out layer 7c) is exposed at the second end surface 9b of the resin molding 9 and connected to the second external electrode 13. When the cathode 7 does not include the cathode lead-out layer 7c, the conductive layer 7b may be exposed at the second end surface 9b of the resin molding 9 and connected to the second external electrode 13.

The sealing resin 8 contains at least a resin, and preferably contains a resin and filler.

Preferred examples of the resin include an epoxy resin, a phenolic resin, a polyimide resin, a silicone resin, a polyamide resin, and a liquid crystal polymer.

Preferred examples of the filler include silica particles, alumina particles, and metal particles.

Preferably, the sealing resin 8 includes a material containing a solid epoxy resin, a phenolic resin and silica particles.

In use of the solid sealing resin 8, the resin molding 9 is preferably formed by a method that uses a resin mold such as a compression mold or a transfer mold, with a compression mold being more preferred. In use of the liquid sealing resin 8, the resin molding is preferably formed by a method that uses a dispenser or printing. In particular, the periphery of the stack 30 is preferably sealed by the sealing resin 8 using a compression mold to produce the resin molding 9.

The resin molding 9 may have rounded corners. The corners of the resin molding 9 may be rounded by barrel polishing, for example.

The first external electrode 11 is connected to the anode 3 exposed at the first end surface 9a of the resin molding 9.

The first external electrode 11 includes a resin electrode layer 11a containing a conductive component and a resin component. Since the first external electrode 11 includes the resin electrode layer 11a containing a resin component, the adhesion between the resin electrode layer 11a and the sealing resin 8 is enhanced in a region where the resin electrode layer 11a and the sealing resin 8 are in contact with each other, thereby improving reliability.

The resin electrode layer 11a includes a first portion 11A facing the whole surface of the first end surface 9a of the resin molding 9, that is, the first end surface 9a of the resin molding 9 is not exposed at the first portion 11A of the resin electrode layer 11a.

A plurality of protrusions 15 arranged periodically side by side are provided on a surface of the first portion 11A of the resin electrode layer 11a which is located on the opposite side of the first end surface 9a of the resin molding 9. Here, although a plurality of protrusions are present on the surface of the baked electrode as described in Patent Literature 2, these protrusions are arranged randomly, whereas the plurality of protrusions 15 are arranged periodically side by side. Since the plurality of protrusions 15 are provided on the first portion 11A of the resin electrode layer 11a, a surface of the first external electrode 11 which is opposite to the first end surface 9a of the resin molding 9 becomes uneven.

The resin electrode layer 11a may further include a third portion 11B that extends from the first portion 11A so as to face a part of each surface in at least one surface selected from the group consisting of the first main surface 9c, the second main surface 9d, the first side surface 9e, or the second side surface 9f of the resin molding 9. More specifically, in the resin electrode layer 11a, the third portion 11B may extend from the first portion 11A so as to face respective parts of all the surfaces of the first main surface 9c, the second main surface 9d, the first side surface 9e, and the second side surface 9f of the resin molding 9, or may extend from the first portion 11A so as to face parts of some surfaces of the first main surface 9c, the second main surface 9d, the first side surface 9e, and the second side surface 9f of the resin molding 9.

In the case where the resin electrode layer 11a includes the third portion 11B, when a plurality of protrusions 15 are provided on a surface of the third portion 11B of the resin electrode layer 11a which is opposite to the resin molding 9, the length in the thickness direction T or the width direction W of the first external electrode 11 tends to be large. Therefore, when the electrolytic capacitor 1 is regulated to have a predetermined size, the length in the thickness direction T or the width direction W of the resin molding 9 tends to be small, so that the length of the effective area of the electrolytic capacitor element 20 in the thickness direction T or in the width direction W tends to be small, and thus the capacitance tends to be small. From this point of view, it is preferable that the plurality of protrusions 15 are not provided on the surface of the third portion 11B of the resin electrode layer 11a which is opposite to the resin molding 9.

In the third portion 11B of the resin electrode layer 11a, the length in the length direction L of a portion facing the first main surface 9c of the resin molding 9 and the length in the length direction L of a portion facing the second main surface 9d of the resin molding 9 may be the same as or different from each other.

In the third portion 11B of the resin electrode layer 11a, the length in the length direction L of a portion facing the first side surface 9e of the resin molding 9 and the length in the length direction L of a portion facing the second side surface 9f of the resin molding 9 may be the same as or different from each other.

In the third portion 11B of the resin electrode layer 11a, the lengths in the length direction L of the portions facing the first main surface 9c and the second main surface 9d of the resin molding 9, and the lengths in the length direction L of the portions facing the first side surface 9e and the second side surface 9f of the resin molding 9 may be the same as or different from each other.

Preferably, the conductive component of the resin electrode layer 11a mainly contains an element metal such as silver, copper, nickel, or tin or an alloy containing at least one of these metals, for example.

Preferably, the resin component of the resin electrode layer 11a mainly contains an epoxy resin, a phenolic resin, or the like.

The resin electrode layer 11a preferably contains the conductive component of 80% by weight to 97% by weight, and the resin component of 3% by weight to 20% by weight. More preferably, the resin electrode layer 11a contains the conductive component of 85% by weight to 95% by weight, and the resin component of 5% by weight to 15% by weight. Still more preferably, the resin electrode layer 11a contains the conductive component of 90% by weight to 95% by weight, and the resin component of 5% by weight to 10% by weight. The resin electrode layer 11a particularly preferably contains the conductive component of 92% by weight to 95% by weight, and the resin component of 5% by weight to 8% by weight.

The composition ratio between the conductive component and the resin component in the resin electrode layer is determined as follows. First, for the cross section shown in FIG. 2, the resin electrode layer is observed with a scanning electron microscope/energy dispersive X-ray analysis (SEM/EDX) to acquire a cross-sectional image. Then, the area ratio between the conductive component and the resin component is calculated, for example, in a square range of 100 μm on a side of the cross-sectional image. The area ratio between the conductive component and the resin component obtained in this way is defined as the composition ratio between the conductive component and the resin component.

The resin electrode layer 11a is preferably formed by applying a conductive paste containing a conductive component and a resin component to a position facing the whole surface of the first end surface 9a of the resin molding 9 by screen printing. At this time, so-called mesh traces caused by the mesh shape of a screen printing plate are caused to appear on a surface of the first portion 11A of the resin electrode layer 11a which is opposite to the first end surface 9a of the resin molding 9. As a result, a plurality of protrusions 15 arranged periodically side by side can be formed on the surface of the first portion 11A of the resin electrode layer 11a which is opposite to the first end surface 9a of the resin molding 9.

The resin electrode layer 11a may be formed by applying a conductive paste to a position facing the whole surface of the first end face 9a of the resin molding 9 by sponge transfer printing.

The first external electrode 11 may further include an outer plating layer 11b provided along the surfaces of the plurality of protrusions 15 of the first portion 11A of the resin electrode layer 11a. In this case, the respective gaps between the plurality of protrusions 15 are not completely filled with the outer plating layer 11b, and a surface of the outer plating layer 11b which is opposite to the first end surface 9a of the resin molding 9 becomes uneven. As a result, a surface of the first external electrode 11 which is opposite to the first end surface 9a of the resin molding 9 becomes uneven.

In FIGS. 1 and 2, a plurality of protrusions 15A are present in the uneven portion of the first external electrode 11, and the plurality of protrusions 15A include the plurality of protrusions 15 and the outer plating layer 11b provided on the surface of the plurality of protrusions 15. In other words, the plurality of protrusions 15A are also periodically arranged side by side in the same manner as the plurality of protrusions 15.

The outer plating layer 11b may be provided on the surface of the third portion 11B of the resin electrode layer 11a.

The outer plating layer 11b may have a single-layer structure or a multilayer structure.

When the outer plating layer 11b has the single-layer structure, the outer plating layer 11b preferably contains copper, nickel, or tin as a main component. As a result, the ESR of the electrolytic capacitor 1 tends to be low.

When the outer plating layer 11b has the multilayer structure, the outer plating layer 11b may include a first outer plating layer 11ba and a second outer plating layer 11bb in order from the resin electrode layer 11a side. In this case, surfaces of the first outer plating layer 11ba and the second outer plating layer 11bb which are opposite to the first end surface 9a of the resin molding 9 become uneven.

The first outer plating layer 11ba is preferably a nickel plating layer containing nickel as a main component.

The nickel plating layer as the first outer plating layer 11ba is formed, for example, by performing electrolytic nickel plating on the resin electrode layer 11a.

The second outer plating layer 11bb is preferably a tin plating layer containing tin as a main component.

The tin plating layer as the second outer plating layer 11bb is formed, for example, by performing electrolytic tin plating so that the first outer plating layer 11ba does not come into contact with air immediately after forming the first outer plating layer 11ba.

The first external electrode 11 may not include the outer plating layer 11b. In this case, the first portion 11A of the resin electrode layer 11a is located on the surface of the first external electrode 11 which is opposite to the first end surface 9a of the resin molding 9, and the plurality of protrusions 15A are configured by the plurality of protrusions 15.

The first external electrode 11 may further include an inner plating layer 11c provided between the anode 3 and the first portion 11A of the resin electrode layer 11a. In this case, the inner plating layer 11c is connected to the anode 3, and the first portion 11A of the resin electrode layer 11a is provided so as to cover the inner plating layer 11c. The anode 3 and the first portion 11A of the resin electrode layer 11a may be connected to each other in a state where the inner plating layer 11c is not provided. However, when the contact resistance between the anode 3 and the first portion 11A of the resin electrode layer 11a is high, the resistance between the anode 3 and the first portion 11A of the resin electrode layer 11a is reduced due to provision of the inner plating layer 11c, so that the ESR of the electrolytic capacitor 1 tends to be low.

The inner plating layer 11c may have a single-layer structure or a multilayer structure.

When the inner plating layer 11c has the single-layer structure, the inner plating layer 11c preferably contains copper, nickel, or silver as a main component. As a result, the ESR of the electrolytic capacitor 1 tends to be low.

When the inner plating layer 11c has the multilayer structure, the inner plating layer 11c may include a first inner plating layer 11ca and a second inner plating layer 11cb in order from the anode 3 side.

The first inner plating layer 11ca is preferably a nickel plating layer containing nickel as a main component.

The nickel plating layer as the first inner plating layer 11ca is formed, for example, by performing a zincate treatment on the first end surface 9a of the resin molding 9, and then performing a displacement plating treatment using electroless nickel plating. The zincate treatment is a treatment for removing oxides on the surface of the metal to be plated and forming a zinc coating on the surface of the metal.

The second inner plating layer 11cb is preferably a silver plating layer containing silver as a main component.

The silver plating layer as the second inner plating layer 11c b is formed, for example, by performing electrolytic silver plating so that the first inner plating layer 11c a does not come into contact with air immediately after forming the first inner plating layer 11ca.

The first external electrode 11 may not include the inner plating layer 11c. In this case, the first portion 11A of the resin electrode layer 11a is connected to the anode 3.

The second external electrode 13 is connected to the cathode 7 exposed at the second end surface 9b of the resin molding 9, in this case, the cathode lead-out layer 7c.

The second external electrode 13 preferably includes a resin electrode layer 13a containing a conductive component and a resin component. Since the second external electrode 13 includes the resin electrode layer 13a containing a resin component, the adhesion between the resin electrode layer 13a and the sealing resin 8 is enhanced in a region where the resin electrode layer 13a and the sealing resin 8 are in contact with each other, thereby improving reliability.

The resin electrode layer 13a preferably includes a second portion 13A facing the whole surface of the second end surface 9b of the resin molding 9. In this case, the second end surface 9b of the resin molding 9 is not exposed at the second portion 13A of the resin electrode layer 13a.

A plurality of protrusions 16 arranged periodically side by side are preferably provided on a surface of the second portion 13A of the resin electrode layer 13a which is located on the opposite side of the second end surface 9b of the resin molding 9. Since the plurality of protrusions 16 are provided on the second portion 13A of the resin electrode layer 13a, a surface of the second external electrode 13 which is opposite to the second end surface 9b of the resin molding 9 becomes uneven.

The resin electrode layer 13a may further include a fourth portion 13B extending from the second portion 13A so as to face of a part of each surface in at least one surface selected from the group consisting of the first main surface 9c, the second main surface 9d, the first side surface 9e, or the second side surface 9f of the resin molding 9. More specifically, in the resin electrode layer 13a, the fourth portion 13B may extend from the second portion 13A so as to face respective parts of all the surfaces of the first main surface 9c, the second main surface 9d, the first side surface 9e, and the second side surface 9f of the resin molding 9, or may extend from the second portion 13A so as to face parts of some surfaces of the first main surface 9c, the second main surface 9d, the first side surface 9e, and the second side surface 9f of the resin molding 9.

In the case where the resin electrode layer 13a includes the fourth portion 13B, when a plurality of protrusions 16 are provided on a surface of the fourth portion 13B of the resin electrode layer 13a which is opposite to the resin molding 9, the length in the thickness direction T or the width direction W of the second external electrodes 13 tends to be large. Therefore, when the electrolytic capacitor 1 is regulated to have a predetermined size, the length in the thickness direction T or the width direction W of the resin molding 9 tends to be small, so that the length of the effective area of the electrolytic capacitor element 20 in the thickness direction T or in the width direction W tends to be small, and thus, the capacitance tends to be small. From this point of view, it is preferable that the plurality of protrusions 16 are not provided on the surface of the fourth portion 13B of the resin electrode layer 13a which is opposite to the resin molding 9.

In the fourth portion 13B of the resin electrode layer 13a, the length in the length direction L of a portion facing the first main surface 9c of the resin molding 9 and the length in the length direction L of a portion facing the second main surface 9d of the resin molding 9 may be the same as or different from each other.

In the fourth portion 13B of the resin electrode layer 13a, the length in the length direction L of a portion facing the first side surface 9e of the resin molding 9 and the length in the length direction L of a portion facing the second side surface 9f of the resin molding 9 may be the same as or different from each other.

In the fourth portion 13B of the resin electrode layer 13a, the lengths in the length direction L of the portions facing the first main surface 9c and the second main surface 9d of the resin molding 9, and the lengths in the length direction L of the portions facing the first side surface 9e and the second side surface 9f of the resin molding 9 may be the same as or different from each other.

Preferably, the conductive component of the resin electrode layer 13a mainly contains an element metal such as silver, copper, nickel, or tin or an alloy containing at least one of these metals, for example.

Preferably, the resin component of the resin electrode layer 13a mainly contains an epoxy resin, a phenolic resin, or the like.

The resin electrode layer 13a preferably contains the conductive component of 80% by weight to 97% by weight, and the resin component of 3% by weight to 20% by weight. More preferably, the resin electrode layer 13a contains the conductive component of 85% by weight to 95% by weight, and the resin component of 5% by weight to 15% by weight. Still more preferably, the resin electrode layer 13a contains the conductive component of 90% by weight to 95% by weight, and the resin component of 5% by weight to 10% by weight. The resin electrode layer 13a particularly preferably contains the conductive component of 92% by weight to 95% by weight, and the resin component of 5% by weight to 8% by weight.

The resin electrode layer 13a is preferably formed by applying a conductive paste containing a conductive component and a resin component to a position facing the whole surface of the second end surface 9b of the resin molding 9 by screen printing. At this time, mesh traces during screen printing are caused to appear on a surface of the second portion 13A of the resin electrode layer 13a which is opposite to the second end surface 9b of the resin molding 9. As a result, a plurality of protrusions 16 arranged periodically side by side can be formed on the surface of the second portion 13A of the resin electrode layer 13a which is opposite to the second end surface 9b of the resin molding 9.

The resin electrode layer 13a may be formed by applying a conductive paste to a position facing the whole surface of the second end surface 9b of the resin molding 9 by sponge transfer printing.

The second external electrode 13 may further include an outer plating layer 13b provided along the surfaces of the plurality of protrusions 16 of the second portion 13A of the resin electrode layer 13a. In this case, the respective gaps between the plurality of protrusions 16 are not completely filled with the outer plating layer 13b, and a surface of the outer plating layer 13b which is opposite to the second end surface 9b of the resin molding 9 becomes uneven. As a result, the surface of the second external electrode 13 which is opposite to the second end surface 9b of the resin molding 9 becomes uneven.

In FIGS. 1 and 2, a plurality of protrusions 16A are present in the uneven portion of the second external electrode 13, and the plurality of protrusions 16A include the plurality of protrusions 16 and the outer plating layer 13b provided on the surface of the plurality of protrusions 16. In other words, the plurality of protrusions 16A are also periodically arranged side by side in the same manner as the plurality of protrusions 16.

The outer plating layer 13b may be provided on the surface of the fourth portion 13B of the resin electrode layer 13a.

The outer plating layer 13b may have a single-layer structure or a multilayer structure.

When the outer plating layer 13b has the single-layer structure, the outer plating layer 13b preferably contains copper, nickel, or tin as a main component. As a result, the ESR of the electrolytic capacitor 1 tends to be low.

When the outer plating layer 13b has the multilayer structure, the outer plating layer 13b may include a first outer plating layer 13ba and a second outer plating layer 13bb in order from the resin electrode layer 13a side. In this case, the surfaces of the first outer plating layer 13ba and the second outer plating layer 13bb which are opposite to the second end surface 9b of the resin molding 9 become uneven.

The first outer plating layer 13ba is preferably a nickel plating layer containing nickel as a main component.

The nickel plating layer as the first outer plating layer 13ba is formed, for example, by performing electrolytic nickel plating on the resin electrode layer 13a.

The second outer plating layer 13bb is preferably a tin plating layer containing tin as a main component.

The tin plating layer as the second outer plating layer 13bb is formed, for example, by performing electrolytic tin plating so that the first outer plating layer 13ba does not come into contact with air immediately after forming the first outer plating layer 13ba.

The second external electrode 13 may not include the outer plating layer 13b. In this case, the second portion 13A of the resin electrode layer 13a is located on a surface of the second external electrode 13 which is opposite to the second end surface 9b of the resin molding 9, and the plurality of protrusions 16A are configured by the plurality of protrusions 16.

The second external electrode 13 may further include an inner plating layer 13c provided between the cathode 7 and the second portion 13A of the resin electrode layer 13a. In this case, the inner plating layer 13c is connected to the cathode 7, and the second portion 13A of the resin electrode layer 13a is provided so as to cover the inner plating layer 13c. The cathode 7 and the second portion 13A of the resin electrode layer 13a may be connected to each other in a state where the inner plating layer 13c is not provided. However, when the contact resistance between the cathode 7 and the second portion 13A of the resin electrode layer 13a is high, the resistance between the cathode 7 and the second portion 13A of the resin electrode layer 13a is reduced due to provision of the inner plating layer 13c, so that the ESR of the electrolytic capacitor 1 tends to be low.

The inner plating layer 13c may have a single-layer structure or a multilayer structure.

When the inner plating layer 13c has the single-layer structure, the inner plating layer 13c preferably contains copper, nickel, or silver as a main component. As a result, the ESR of the electrolytic capacitor 1 tends to be low.

When the inner plated layer 13c has the multilayer structure, the inner plating layer 13c may include a first inner plating layer 13ca and a second inner plating layer 13cb in order from the cathode 7 side.

The first inner plating layer 13ca is preferably a nickel plating layer containing nickel as a main component.

The nickel plating layer as the first inner plating layer 13ca is formed, for example, on the second end surface 9b of the resin molding 9 by the same method as the nickel plating layer as the first inner plating layer 11ca. The zincate treatment may not be performed. However, when the cathode 7, in this case, the cathode lead-out layer 7c, contains aluminum as a main component, it is preferable to perform the zincate treatment.

The second inner plating layer 13cb is preferably a silver plating layer containing silver as a main component.

The silver plating layer as the second inner plating layer 13cb is formed, for example, by performing electrolytic silver plating so that the first inner plating layer 13ca does not come into contact with air immediately after forming the first inner plating layer 13ca.

The second external electrode 13 may not include the inner plating layer 13c. In this case, the second portion 13A of the resin electrode layer 13a is connected to the cathode 7.

Figure 3:
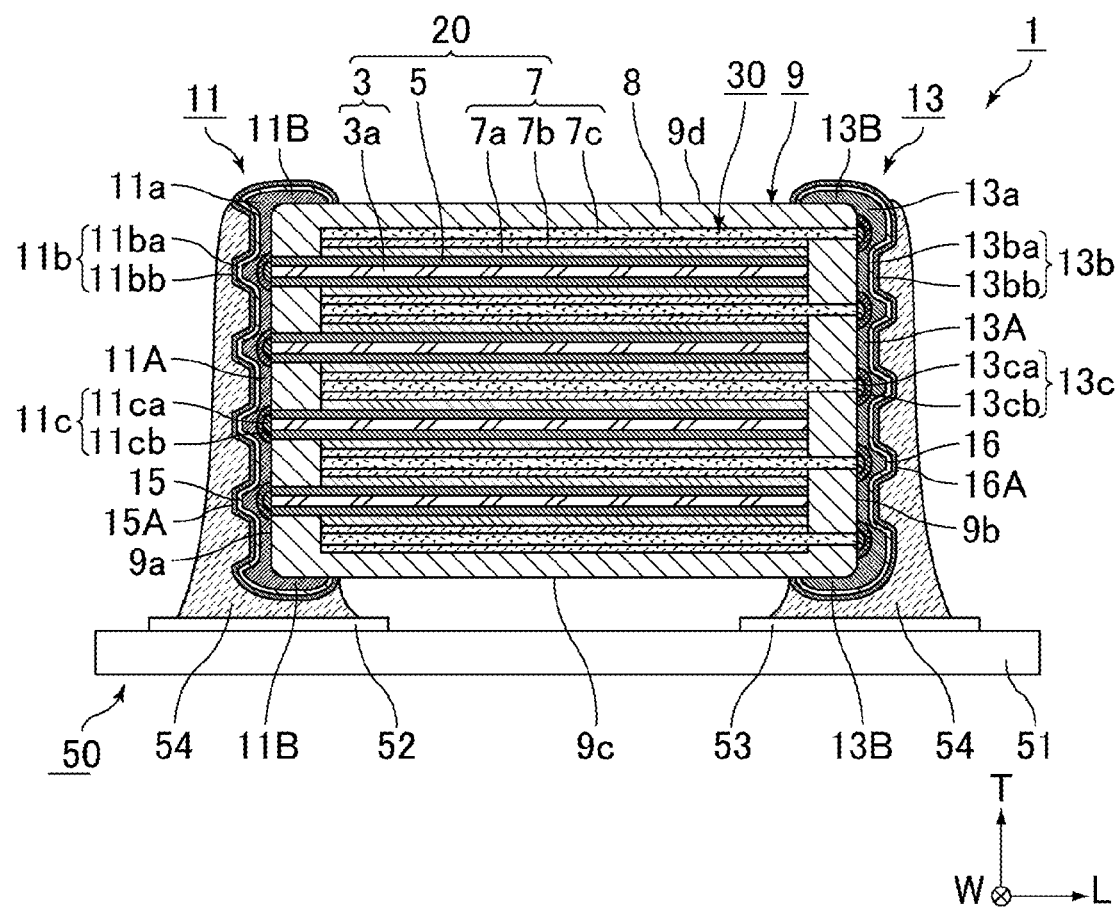
FIG. 3 is a schematic cross-sectional view showing a state in which an electrolytic capacitor shown in FIG. 2 is mounted on a wiring board via a conductive bonding material.

FIG. 3 is a schematic cross-sectional view showing a state in which an electrolytic capacitor shown in FIG. 2 is mounted on a wiring board via a conductive bonding material.

As shown in FIG. 3, the electrolytic capacitor 1 is mounted on a wiring board 50 via a conductive bonding material 54 such as solder. The wiring board 50 includes a printed board 51, a land electrode 52 provided on a surface of the printed board 51, and a land electrode 53 provided on the surface of the printed board 51 at a position different from that of the land electrode 52. In a state where the electrolytic capacitor 1 is mounted on the wiring board 50 via the conductive bonding material 54, the first external electrode 11 and the land electrode 52 are electrically connected to each other via a conductive bonding material 54, and the second external electrode 13 and the land electrode 53 are electrically connected to each other via another conductive bonding material 54.

In FIG. 3, a plurality of protrusions 15 are provided on a surface of the first portion 11A of the resin electrode layer 11a of the first external electrode 11 which is opposite to the first end surface 9a of the resin molding 9, so that the surface of the first external electrode 11, in this case, the outer plating layer 11b which is opposite to the first end surface 9a of the resin molding 9 becomes uneven. Therefore, when the electrolytic capacitor 1 is mounted on the wiring board 50 via the conductive bonding material 54, the contact area between the first external electrode 11 and the conductive bonding material 54 is increased, and also an anchor effect is exhibited. Therefore, the adhesion between the first external electrode 11 and the conductive bonding material 54 is enhanced. Further, when measuring the electrical characteristics of the electrolytic capacitor 1, a measurement probe can be brought into contact with the plurality of protrusions 15A present in an uneven portion of the first external electrode 11, so that the measurement is stabilized.

In FIG. 3, a plurality of protrusions 16 are provided on a surface of the second portion 13A of the resin electrode layer 13a of the second external electrode 13 which is opposite to the second end surface 9b of the resin molding 9, so that the surface of the second external electrode 13, in this case, the outer plating layer 13b which is opposite to the second end surface 9b of the resin molding 9 becomes uneven. Therefore, when the electrolytic capacitor 1 is mounted on the wiring board 50 via the conductive bonding material 54, the contact area between the second external electrode 13 and the conductive bonding material 54 is increased, and the anchor effect is exhibited. Therefore, the adhesion between the second external electrode 13 and the conductive bonding material 54 is enhanced. Further, when measuring the electrical characteristics of the electrolytic capacitor 1, a measurement probe can be brought into contact with the plurality of protrusions 16A present in an uneven portion of the second external electrode 13, so that the measurement is stabilized.

The form of the first external electrode 11, particularly the form of the resin electrode layer 11a will be described below.

On the surface of the first portion 11A of the resin electrode layer 11a which is opposite to the first end surface 9a of the resin molding 9, the plurality of protrusions 15 are preferably arranged periodically side by side in at least one direction, and more preferably arranged periodically side by side in a plurality of intersecting directions. Examples of a mode in which the plurality of protrusions 15 are periodically arranged side by side in a plurality of intersecting directions include, for example, a mode in which the plurality of protrusions 15 are arranged in a matrix form. In this case, the plurality of protrusions 15 may be arranged along the thickness direction T and the width direction W in a matrix form.

Likewise, on the surface of the first external electrode 11 which is opposite to the first end surface 9a of the resin molding 9, the plurality of protrusions 15A are preferably arranged periodically side by side in at least one direction, and more preferably arranged periodically side by side in a plurality of intersecting directions. Examples of a mode in which the plurality of protrusions 15A are periodically arranged side by side in the plurality of intersecting directions include, for example, a mode in which the plurality of protrusions 15A are arranged in a matrix form. In this case, the plurality of protrusions 15A may be arranged along the thickness direction T and the width direction W in a matrix form.

It is preferable that the plurality of protrusions 15 are provided in a region on the surface of the first portion 11A of the resin electrode layer 11a which is opposite to the first end surface 9a of the resin molding 9, the area of the region being 80% or more of the area of the surface. More preferably, the plurality of protrusions 15 are provided on the whole surface of the first portion 11A of the resin electrode layer 11a which is opposite to the first end surface 9a of the resin molding 9.

Likewise, it is preferable that the plurality of protrusions 15A are provided in a region on the surface of the first external electrode 11 which is opposite to the first end surface 9a of the resin molding 9, the area of the region being 80% or more of the area of the surface. More preferably, the plurality of protrusions 15A are provided on the whole surface of the first external electrode 11 which is opposite to the first end surface 9a of the resin molding 9.

When viewing a cross section along the thickness direction T and the width direction W, the cross-sectional shape of each of the plurality of protrusions 15 may be polygonal or circular.

Likewise, when viewing the cross section along the thickness direction T and the width direction W, the cross-sectional shape of each of the plurality of protrusions 15A may be polygonal or circular.

Figure 4:
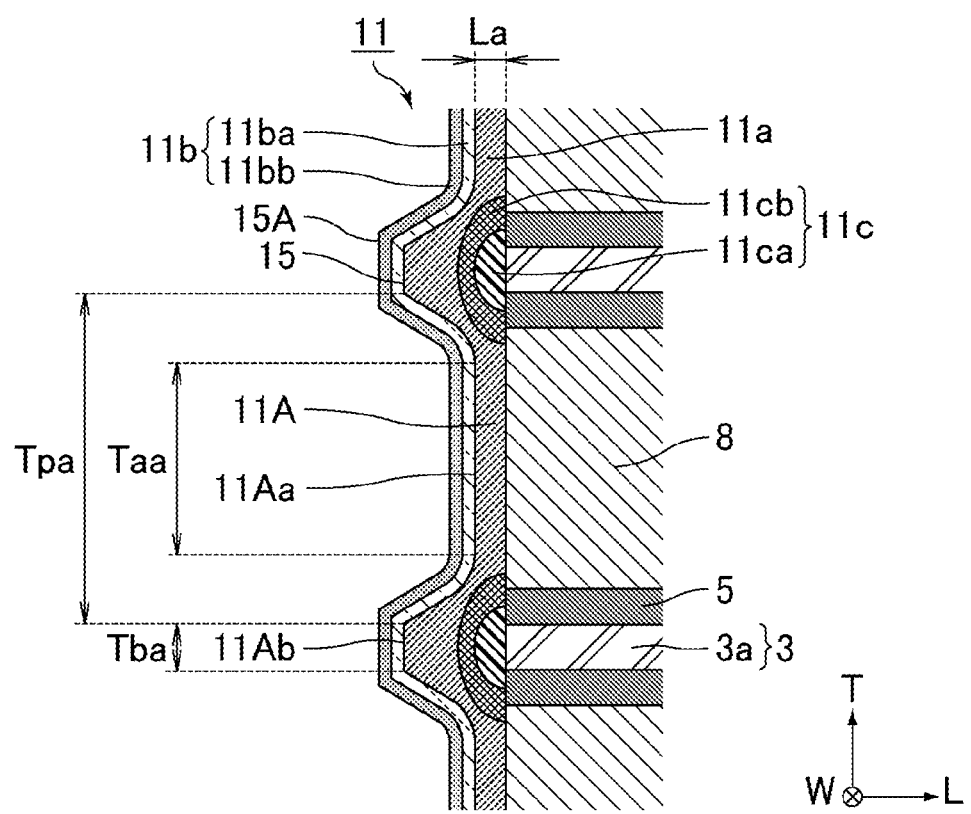
FIG. 4 is a schematic cross-sectional view showing an enlarged region near a first external electrode in the electrolytic capacitor shown in FIG. 2.

FIG. 4 is a schematic cross-sectional view showing an enlarged region near the first external electrode in the electrolytic capacitor shown in FIG. 2.

When viewing the cross section along the length direction L and the thickness direction T shown in FIG. 4, it is preferable that the cross-sectional shape of each of the plurality of protrusions 15 is a so-called tapered shape in which the length thereof in the thickness direction T decreases from the first end surface 9a side of the resin molding 9 to the opposite side to the first end surface 9a. In this case, the ridgeline of each of the plurality of protrusions 15 may be a curved line or a straight line.

When viewing the cross section along the length direction L and the thickness direction T shown in FIG. 4, the cross-sectional shape of each of the plurality of protrusions 15 may be a shape in which the length thereof in the thickness direction T is constant from the first end surface 9a side of the resin molding 9 to the opposite side to the first end surface 9a.

Likewise, when viewing the cross section along the length direction L and the thickness direction T shown in FIG. 4, it is preferable that the cross-sectional shape of each of the plurality of protrusions 15A is a tapered shape in which the length thereof in the thickness direction T decreases from the first end surface 9a side of the resin molding 9 to the opposite side to the first end surface 9a. In this case, the ridgeline of each of the plurality of protrusions 15A may be a curved line or a straight line.

When viewing the cross section along the length direction L and the thickness direction T shown in FIG. 4, the cross-sectional shape of each of the plurality of protrusions 15A may be a shape in which the length thereof in the thickness direction T is constant from the first end surface 9a side of the resin molding 9 to the opposite side to the first end surface 9a.

When viewing the cross section along the length direction L and the thickness direction T shown in FIG. 4, it is preferable that the surface of the first portion 11A of the resin electrode layer 11a has an arithmetic mean roughness Ra defined in JIS B 0601:2013 of 20 μm to 100 μm. In this case, in the first portion 11A of the resin electrode layer 11a, the lengths in the length direction L of the plurality of protrusions 15 are relatively large. Therefore, when the electrolytic capacitor 1 is mounted on the wiring board 50 via the conductive bonding material 54, the contact area between the first external electrode 11 and the conductive bonding material 54 is sufficiently increased, and the anchor effect is sufficiently exhibited, so that the adhesion between the first external electrode 11 and the conductive bonding material 54 is sufficiently enhanced. Further, when forming the outer plating layer 11$b$, it can be easily formed along the surfaces of the plurality of protrusions 15.

When viewing the cross section along the length direction L and the thickness direction T shown in FIG. 4, it is preferable that bottom surfaces 11Aa located in respective gaps between the plurality of protrusions 15 and top surfaces 11Ab of the plurality of protrusions 15 are present on the surface of the first portion 11A of the resin electrode layer 11$a$. In this case, when the electrolytic capacitor 1 is mounted on the wiring board 50 via the conductive bonding material 54, the contact area between the first external electrode 11 and the conductive bonding material 54 is sufficiently increased, and the anchor effect is sufficiently exhibited, so that the adhesion between the first external electrode 11 and the conductive bonding material 54 is sufficiently enhanced.

With respect to the surface of the first portion 11A of the resin electrode layer 11$a$, when viewing the cross section shown in FIG. 4, the bottom surface 11Aa includes surfaces located between the plurality of protrusions 15, and indicates a range which includes a point closest to the first end surface 9$a$ side of the resin molding 9 in the length direction L and has an arithmetic mean roughness Ra of 5 µm or less as defined in JIS B 0601:2013 in each surface.

With respect to the surface of the first portion 11A of the resin electrode layer 11$a$, when viewing the cross section shown in FIG. 4, the top surface 11Ab indicates a range which includes a point located on the most opposite side to the first end surface 9$a$ of the resin molding 9 in the length direction L and has an arithmetic mean roughness Ra of 5 µm or less defined in JIS B 0601:2013 in each of the plurality of protrusions 15.

The length Taa in the thickness direction T of the bottom surface 11Aa is preferably 50 µm to 200 µm. In this case, in the first portion 11A of the resin electrode layer 11$a$, the intervals in the thickness direction T between the plurality of protrusions 15 are relatively large. Therefore, when the electrolytic capacitor 1 is mounted on the wiring board 50 via the conductive bonding material 54, the conductive bonding material 54 easily infiltrates into the gaps between the plurality of protrusions 15A present in the uneven portions of the first external electrodes 11. Further, when forming the outer plating layer 11$b$, the outer plating layer 11$b$ is easily formed along the surfaces of the plurality of protrusions 15.

When the bottom surfaces 11Aa are present at 20 or more locations, the length Taa in the thickness direction T of the bottom surface 11Aa is defined by an average value of the lengths in the thickness direction T of the bottom surfaces 11Aa at 20 locations out of the 20 or more locations, and when the bottom surfaces 11Aa are not present at 20 or more locations, the length Taa in the thickness direction T of the bottom surface 11Aa is defined by an average value of the lengths in the thickness direction T of all the present bottom surfaces 11Aa.

The shortest distance Tpa in the thickness direction T between the top surfaces 11Ab of two adjacent protrusions 15 out of the plurality of protrusions 15 is preferably 50 µm to 100 µm. In this case, in the first portion 11A of the resin electrode layer 11$a$, the intervals in the thickness direction T between the plurality of protrusions 15 are relatively large. Therefore, when the electrolytic capacitor 1 is mounted on the wiring board 50 via the conductive bonding material 54, the conductive bonding material 54 easily infiltrates into the gaps between the plurality of protrusions 15A present in the uneven portion of the first external electrode 11. Further, when forming the outer plating layer 11$b$, the outer plating layer 11$b$ is easily formed along the surfaces of the plurality of protrusions 15.

When the region between the top surfaces 11Ab are present at 20 or more locations, the shortest distance Tpa in the thickness direction T between the top surfaces 11Ab is defined by an average value of the shortest distances in the thickness direction T for the regions at 20 locations out of the 20 or more locations, and when the regions between the top surfaces 11Ab are not present at 20 or more locations, the shortest distance Tpa in the thickness direction T between the top surfaces 11Ab is defined by an average value of the shortest distances in the thickness direction T for all the regions.

The shortest distance Tpa in the thickness direction T between the top surfaces 11Ab is preferably larger than the length Taa in the thickness direction T of the bottom surface 11Aa. In this case, when the electrolytic capacitor 1 is mounted on the wiring board 50 via the conductive bonding material 54, the conductive bonding material 54 easily infiltrates into the gaps between the plurality of protrusions 15A present in the uneven portion of the first external electrode 11. Further, when forming the outer plating layer 11$b$, the outer plating layer 11$b$ is easily formed along the surfaces of the plurality of protrusions 15.

The shortest distance Tpa in the thickness direction T between the top surfaces 11Ab may be the same as the length Taa in the thickness direction T of the bottom surface 11Aa, or may be smaller than the length Taa in the thickness direction T of the bottom surface 11Aa.

The length Tba in the thickness direction T of the top surface 11Ab is preferably 10 µm to 100 µm. In this case, when the electrolytic capacitor 1 is mounted on the wiring board 50 via the conductive bonding material 54, the contact area between the first external electrode 11 and the conductive bonding material 54 is sufficiently increased, and the anchor effect is sufficiently exhibited, so that the adhesion between the first external electrode 11 and the conductive bonding material 54 is sufficiently enhanced. Further, when forming the outer plating layer 11$b$, the outer plating layer 11$b$ is easily formed along the surfaces of the plurality of protrusions 15.

When the top surfaces 11Ab are present at 20 or more locations, the length Tba in the thickness direction T of the top surface 11Ab is defined by an average value of the lengths in the thickness direction T of the top surfaces 11Ab at 20 locations out of the 20 or more locations, and when the top surfaces 11Ab are not present at 20 or more locations, the length Tba in the thickness direction T of the top surface 11Ab is defined by an average value of the lengths in the thickness direction T of all the top surfaces 11Ab.

The length Taa in the thickness direction T of the bottom surface 11Aa is preferably larger than the length Tba in the thickness direction T of the top surface 11Ab. In this case, when the electrolytic capacitor 1 is mounted on the wiring board 50 via the conductive bonding material 54, the conductive bonding material 54 easily infiltrates into the gaps between the plurality of protrusions 15A present in the uneven portion of the first external electrode 11. Further, when forming the outer plating layer 11b, the outer plating layer 11b is easily formed along the surfaces of the plurality of protrusions 15.

The length Taa in the thickness direction T of the bottom surface 11Aa may be the same as the length Tba in the thickness direction T of the top surface 11Ab, or may be smaller than the length Tba in the thickness direction T of the top surface 11Ab.

The shortest distance La in the length direction L between the bottom surface 11Aa and the first end surface 9a is preferably 10 μm to 50 μm.

In FIG. 4, each of the plurality of protrusions 15 is provided at a position facing the anode 3 in the length direction L, but it may not be provided at a position facing the anode 3 in the length direction L. For example, each of the plurality of protrusions 15 may be provided at a position facing the region between the anodes 3 in the length direction L.

In FIG. 4, each of the plurality of protrusions 15 is provided at a position facing the inner plating layer 11c in the length direction L, but it may not be provided at a position facing the inner plating layer 11c in the length direction L. For example, each of the plurality of protrusions 15 may be provided at a position facing the region between the inner plating layers 11c in the length direction L.

Although not shown, when viewing the cross section along the length direction L and the width direction W, it is preferable that the cross-sectional shape of each of the plurality of protrusions 15 is a tapered shape in which the length thereof in the width direction W decreases from the first end surface 9a side of the resin molding 9 to the opposite side to the first end surface 9a. In this case, the ridgeline of each of the plurality of protrusions 15 may be a curved line or a straight line.

When viewing the cross section along the length direction L and the width direction W, the cross-sectional shape of each of the plurality of protrusions 15 may be a shape in which the length thereof in the width direction W is constant from the first end surface 9a side of the resin molding 9 to the opposite side to the first end surface 9a.

Likewise, when viewing the cross section along the length direction L and the width direction W, it is preferable that the cross-sectional shape of each of the plurality of protrusions 15A is a tapered shape in which the length thereof in the width direction W decreases from the first end surface 9a side of the resin molding 9 to the opposite side to the first end surface 9a. In this case, the ridgeline of each of the plurality of protrusions 15A may be a curved line or a straight line.

When viewing the cross section along the length direction L and the width direction W, the cross-sectional shape of each of the plurality of protrusions 15A may be a shape in which the length thereof in the width direction W is constant from the first end surface 9a side of the resin molding 9 to the opposite side to the first end surface 9a.

When viewing the cross section along the length direction L and the width direction W, it is preferable that the surface of the first portion 11A of the resin electrode layer 11a has an arithmetic mean roughness Ra defined in JIS B 0601: 2013 of 20 μm to 100 μm.

The arithmetic mean roughness Ra of the surface of the first portion 11A of the resin electrode layer 11a may be the same or different between when viewing the cross section along the length direction L and the thickness direction T and when viewing the cross section along the length direction L and the width direction W.

When viewing the cross section along the length direction L and the width direction W, similarly to when viewing the cross section along the length direction L and the thickness direction T, it is preferable that the bottom surfaces located in respective gaps between the plurality of protrusions 15 and the top surfaces of the plurality of protrusions 15 are present on the surface of the first portion 11A of the resin electrode layer 11a.

The length in the width direction W of the bottom surface is preferably 50 μm to 200 μm.

The length in the width direction W of the bottom surface may be the same as or different from the length Taa in the thickness direction T of the bottom surface 11Aa.

The shortest distance in the width direction W between the top surfaces of two adjacent protrusions 15 out of the plurality of protrusions 15 is preferably 50 μm to 100 μm.

The shortest distance in the width direction W between the top surfaces is preferably larger than the length in the width direction W of the bottom surface.

The shortest distance in the width direction W between the top surfaces may be the same as the length in the width direction W of the bottom surface, or may be smaller than the length in the width direction W of the bottom surface.

The shortest distance in the width direction W between the top surfaces may be the same as or different from the shortest distance Tpa in the thickness direction T between the top surfaces 11Ab.

The length in the width direction W of the top surface is preferably 10 μm to 100 μm.

The length in the width direction W of the top surface may be the same as or different from the length Tba in the thickness direction T of the top surface 11Ab.

The length in the width direction W of the bottom surface is preferably larger than the length in the width direction W of the top surface.

The length in the width direction W of the bottom surface may be the same as the length in the width direction W of the top surface, or may be smaller than the length in the width direction W of the top surface.

In the first external electrode 11, a cross section along the length direction L and the thickness direction T, a cross section along the length direction L and the width direction W, and a cross section along the thickness direction T and the width direction W are observed with a scanning electron microscope (SEM). Various parameters of the resin electrode layer 11a such as the above-described arithmetic mean roughness Ra of the surface of the first portion 11A of the resin electrode layer 11a are measured from cross-sectional images captured by the scanning electron microscope.

The form of the second external electrode 13, particularly the form of the resin electrode layer 13a will be described below.

On the surface of the second portion 13A of the resin electrode layer 13a which is opposite to the second end surface 9b of the resin molding 9, the plurality of protrusions 16 are preferably arranged periodically side by side in at least one direction, and more preferably arranged periodically side by side in a plurality of intersecting directions. Examples of a mode in which the plurality of protrusions 16 are periodically arranged side by side in a plurality of intersecting directions include, for example, a mode in which the plurality of protrusions 16 are arranged in a matrix form. In this case, the plurality of protrusions 16 may be arranged in the thickness direction T and the width direction W in a matrix form.

Likewise, on the surface of the second external electrode 13 which is opposite to the second end face 9b of the resin molding 9, the plurality of protrusions 16A are preferably arranged periodically side by side in at least one direction, and more preferably arranged periodically side by side in a plurality of intersecting directions. Examples of a mode in which the plurality of protrusions 16A are periodically arranged side by side in the plurality of intersecting directions include, for example, a mode in which the plurality of protrusions 16A are arranged in a matrix form. In this case, the plurality of protrusions 16A may be arranged along the thickness direction T and the width direction W in a matrix form.

It is preferable that the plurality of protrusions 16 are provided in a region on the surface of the second portion 13A of the resin electrode layer 13a which is opposite to the second end surface 9b of the resin molding 9, the area of the region being 80% or more of the area of the surface. More preferably, the plurality of protrusions 16 are provided on the whole surface of the second portion 13A of the resin electrode layer 13a which is opposite to the second end surface 9b of the resin molding 9.

Likewise, it is preferable that the plurality of protrusions 16A are provided in a region on the surface of the second external electrode 13 which is opposite to the second end surface 9b of the resin molding 9, the area of the region being 80% or more of the area of the surface. More preferably, the plurality of protrusions 16A are provided on the whole surface of the second external electrode 13 which is opposite to the second end surface 9b of the resin molding 9.

When viewing a cross section along the thickness direction T and the width direction W, the cross-sectional shape of each of the plurality of protrusions 16 may be polygonal or circular.

Likewise, when viewing a cross section along the thickness direction T and the width direction W, the cross-sectional shape of each of the plurality of protrusions 16A may be polygonal or circular.

Figure 5:
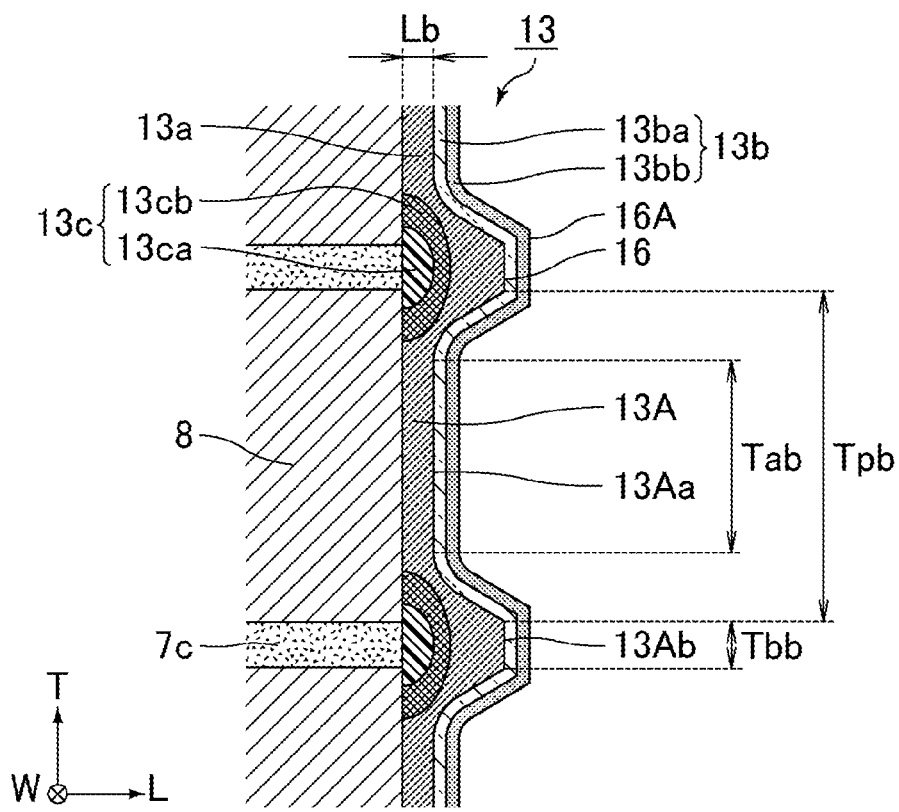
FIG. 5 is a schematic cross-sectional view showing an enlarged region near a second external electrode in the electrolytic capacitor shown in FIG. 2.

FIG. 5 is a schematic cross-sectional view showing an enlarged region near the second external electrode in the electrolytic capacitor shown in FIG. 2.

When viewing the cross section along the length direction L and the thickness direction T shown in FIG. 5, it is preferable that the cross-sectional shape of each of the plurality of protrusions 16 is a so-called tapered shape in which the length thereof in the thickness direction T decreases from the second end surface 9b side of the resin molding 9 to the opposite side to the second end surface 9b. In this case, the ridgeline of each of the plurality of protrusions 16 may be a curved line or a straight line.

When viewing the cross section along the length direction L and the thickness direction T shown in FIG. 5, the cross-sectional shape of each of the plurality of protrusions 16 may be a shape in which the length thereof in the thickness direction T is constant from the second end surface 9b side of the resin molding 9 to the opposite side to the second end surface 9b.

Likewise, when viewing the cross section along the length direction L and the thickness direction T shown in FIG. 5, it is preferable that the cross-sectional shape of each of the plurality of protrusions 16A is a tapered shape in which the length thereof in the thickness direction T decreases from the second end surface 9b side of the resin molding 9 to the opposite side to the second end surface 9b. In this case, the ridgeline of each of the plurality of protrusions 16A may be a curved line or a straight line.

When viewing the cross section along the length direction L and thickness direction T shown in FIG. 5, the cross-sectional shape of each of the plurality of protrusions 16A may be a shape in which the length thereof in the thickness direction T is constant from the second end surface 9b side of the resin molding 9 to the opposite side to the second end surface 9b.

When viewing the cross section along the length direction L and the thickness direction T shown in FIG. 5, it is preferable that the surface of the second portion 13A of the resin electrode layer 13a has an arithmetic mean roughness Ra defined in JIS B 0601:2013 of 20 µm to 100 µm. In this case, in the second portion 13A of the resin electrode layer 13a, the length in the length direction L of the plurality of protrusions 16 are relatively large. Therefore, when the electrolytic capacitor 1 is mounted on the wiring board 50 via the conductive bonding material 54, the contact area between the second external electrode 13 and the conductive bonding material 54 is sufficiently increased, and the anchor effect is sufficiently exhibited, so that the adhesion between the second external electrode 13 and the conductive bonding material 54 is sufficiently enhanced. Further, when forming the outer plating layer 13b, it can be easily formed along the surfaces of the plurality of protrusions 16.

When viewing the cross section along the length direction L and the thickness direction T shown in FIG. 5, it is preferable that bottom surfaces 13Aa located in respective gaps between the plurality of protrusions 16 and top surfaces 13Ab of the plurality of protrusions 16 are present on the surface of the second portion 13A of the resin electrode layer 13a. In this case, when the electrolytic capacitor 1 is mounted on the wiring board 50 via the conductive bonding material 54, the contact area between the second external electrode 13 and the conductive bonding material 54 is sufficiently increased, and the anchor effect is sufficiently exhibited, so that the adhesion between the second external electrode 13 and the conductive bonding material 54 is sufficiently enhanced.

With respect to the surface of the second portion 13A of the resin electrode layer 13a, when viewing the cross section shown in FIG. 5, the bottom surface 13Aa includes surfaces located between the plurality of protrusions 16 and indicates a range which includes a point closest to the second end surface 9b side of the resin molding 9 in the length direction L and has an arithmetic mean roughness Ra of 5 µm or less as defined in JIS B 0601:2013 in each surface.

With respect to the surface of the second portion 13A of the resin electrode layer 13a, when viewing the cross section shown in FIG. 5, the top surface 13Ab indicates a range which includes a point located on the most opposite side to the second end surface 9b of the resin molding 9 in the length direction L and has an arithmetic mean roughness Ra of 5 µm or less defined in JIS B 0601:2013 in each of the plurality of protrusions 16.

The length Tab in the thickness direction T of the bottom surface 13Aa is preferably 50 µm to 200 µm. In this case, in the second portion 13A of the resin electrode layer 13a, the intervals in the thickness direction T between the plurality of protrusions 16 are relatively large. Therefore, when the electrolytic capacitor 1 is mounted on the wiring board 50 via the conductive bonding material 54, the conductive bonding material 54 easily infiltrates into the gaps between the plurality of protrusions 16A present in the uneven portion of the second external electrode 13. Further, when forming the outer plating layer 13b, the outer plating layer 13b is easily formed along the surfaces of the plurality of protrusions 16.

When the bottom surfaces 13Aa are present at 20 or more locations, the length Tab in the thickness direction T of the bottom surface 13Aa is defined by an average value of the lengths in the thickness direction T of the bottom surfaces 13Aa at 20 locations out of the 20 or more locations, and when the bottom surfaces 13Aa are not present at 20 or more locations, the length Tab in the thickness direction T of the bottom surface 13Aa is defined by an average value of the lengths in the thickness direction T of all the bottom surfaces 13Aa.

The shortest distance Tpb in the thickness direction T between the top surfaces 13Ab of two adjacent protrusions 16 out of the plurality of protrusions 16 is preferably 50 μm to 100 μm. In this case, in the second portion 13A of the resin electrode layer 13a, the intervals in the thickness direction T between the plurality of protrusions 16 are relatively large. Therefore, when the electrolytic capacitor 1 is mounted on the wiring board 50 via the conductive bonding material 54, the conductive bonding material 54 easily infiltrates into the gaps between the plurality of protrusions 16A present in the uneven portion of the second external electrodes 13. Further, when forming the outer plating layer 13b, the outer plating layer 13b is easily formed along the surfaces of the plurality of protrusions 16.

When the regions between the top surfaces 13Ab are present at 20 or more locations, the shortest distance Tpb in the thickness direction T between the top surfaces 13Ab is defined by an average value of the shortest distances in the thickness direction T for the regions located at 20 locations out of the 20 or more locations, and when the regions between the top surfaces 13Ab are not present at 20 or more locations, the shortest distance Tpb in the thickness direction T between the top surfaces 13Ab is defined by an average value of the shortest distances in the thickness direction T for all the regions.

The shortest distance Tpb in the thickness direction T between the top surfaces 13Ab is preferably larger than the length Tab in the thickness direction T of the bottom surface 13Aa. In this case, when the electrolytic capacitor 1 is mounted on the wiring board 50 via the conductive bonding material 54, the conductive bonding material 54 easily infiltrates into the gaps between the plurality of protrusions 16A present in the uneven portion of the second external electrode 13. Further, when forming the outer plating layer 13b, the outer plating layer 13b is easily formed along the surfaces of the plurality of protrusions 16.

The shortest distance Tpb in the thickness direction T between the top surfaces 13Ab may be the same as the length Tab in the thickness direction T of the bottom surface 13Aa, or may be smaller than the length Tab in the thickness direction T of the bottom surface 13Aa.

The length Tbb in the thickness direction T of the top surface 13Ab is preferably 10 μm to 100 μm. In this case, when the electrolytic capacitor 1 is mounted on the wiring board 50 via the conductive bonding material 54, the contact area between the second external electrode 13 and the conductive bonding material 54 is sufficiently increased, and the anchor effect is sufficiently exhibited, so that the adhesion between the second external electrode 13 and the conductive bonding material 54 is sufficiently enhanced. Further, when forming the outer plating layer 13b, the outer plating layer 13b is easily formed along the surfaces of the plurality of protrusions 16.

When the top surfaces 13Ab are present at 20 or more locations, the length Tbb in the thickness direction T of the top surface 13Ab is defined by an average value of the lengths in the thickness direction T of the top surfaces 13Ab at 20 locations out of the 20 or more locations, and when the top surfaces 13Ab are not present at 20 or more locations, the length Tbb in the thickness direction T of the top surface 13Ab is defined by an average value of the lengths in the thickness direction T of all the top surfaces 13Ab.

The length Tab in the thickness direction T of the bottom surface 13Aa is preferably larger than the length Tbb in the thickness direction T of the top surface 13Ab. In this case, when the electrolytic capacitor 1 is mounted on the wiring board 50 via the conductive bonding material 54, the conductive bonding material 54 easily infiltrates into the gaps between the plurality of protrusions 16A present in the uneven portion of the second external electrode 13. Further, when forming the outer plating layer 13b, the outer plating layer 13b is easily formed along the surfaces of the plurality of protrusions 16.

The length Tab in the thickness direction T of the bottom surface 13Aa may be the same as the length Tbb in the thickness direction T of the top surface 13Ab, or may be smaller than the length Tbb in the thickness direction T of the top surface 13Ab.

The shortest distance Lb in the length direction L between the bottom surface 13Aa and the second end surface 9b is preferably 10 μm to 50 μm.

In FIG. 5, each of the plurality of protrusions 16 is provided at a position facing the cathode 7, in this case, the cathode lead-out layer 7c in the length direction L, but it may not be provided at a position facing the cathode 7 in the length direction L. For example, each of the plurality of protrusions 16 may be provided at a position facing a region between the cathodes 7 in the length direction L.

In FIG. 5, each of the plurality of protrusions 16 is provided at a position facing the inner plating layer 13c in the length direction L, but it may not be provided at a position facing the inner plating layer 13c in the length direction L. For example, each of the plurality of protrusions 16 may be provided at a position facing the region between the inner plating layers 13c in the length direction L.

Although not shown, when viewing the cross section along the length direction L and the width direction W, it is preferable that the cross-sectional shape of each of the plurality of protrusions 16 is a tapered shape in which the length thereof in the width direction W decreases from the second end surface 9b side of the resin molding 9 to the opposite side to the second end surface 9b. In this case, the ridgeline of each of the plurality of protrusions 16 may be a curved line or a straight line.

When viewing the cross section along the length direction L and the width direction W, the cross-sectional shape of each of the plurality of protrusions 16 may be a shape in which the length thereof in the width direction W is constant from the second end surface 9b side of the resin molding 9 to the opposite side to the second end surface 9b.

Likewise, when viewing the cross section along the length direction L and the width direction W, it is preferable that the cross-sectional shape of each of the plurality of protrusions 16A is a tapered shape in which the length thereof in the width direction W decreases from the second end surface 9b side of the resin molding 9 to the opposite side to the second end surface 9b. In this case, the ridgeline of each of the plurality of protrusions 16A may be a curved line or a straight line.

When viewing the cross section along the length direction L and the width direction W, the cross-sectional shape of each of the plurality of protrusions 16A may be a shape in which the length thereof in the width direction W is constant from the second end surface 9b side of the resin molding 9 to the opposite side to the second end surface 9b.

When viewing the cross section along the length direction L and the width direction W, it is preferable that the surface of the second portion 13A of the resin electrode layer 13a has an arithmetic mean roughness Ra defined in JIS B 0601:2013 of 20 μm to 100 μm.

The arithmetic mean roughness Ra of the surface of the second portion 13A of the resin electrode layer 13a may be the same or different between when viewing the cross section along the length direction L and the thickness direction T and when viewing a cross section along the length direction L and the width direction W.

When viewing the cross section along the length direction L and the width direction W, similarly to when viewing the cross section along the length direction L and the thickness direction T, it is preferable that the bottom surfaces located in respective gaps between the plurality of protrusions 16 and the top surfaces of the plurality of protrusions 16 are present on the surface of the second portion 13A of the resin electrode layer 13a.

The length in the width direction W of the bottom surface is preferably 50 μm to 200 μm.

The length in the width direction W of the bottom surface may be the same as or different from the length Tab in the thickness direction T of the bottom surface 13Aa.

The shortest distance in the width direction W between the top surfaces of two adjacent protrusions 16 out of the plurality of protrusions 16 is preferably 50 μm to 100 μm.

The shortest distance in the width direction W between the top surfaces is preferably larger than the length in the width direction W of the bottom surface.

The shortest distance in the width direction W between the top surfaces may be the same as the length in the width direction W of the bottom surface, or may be smaller than the length in the width direction W of the bottom surface.

The shortest distance in the width direction W between the top surfaces may be the same as or different from the shortest distance Tpb in the thickness direction T between the top surfaces 13Ab.

The length in the width direction W of the top surface is preferably 10 μm to 100 μm.

The length in the width direction W of the top surface may be the same as or different from the length Tbb in the thickness direction T of the top surface 13Ab.

The length in the width direction W of the bottom surface is preferably larger than the length in the width direction W of the top surface.

The length in the width direction W of the bottom surface may be the same as the length in the width direction W of the top surface, or may be smaller than the length in the width direction W of the top surface.

In the second external electrode 13, a cross section along the length direction L and the thickness direction T, a cross section along the length direction L and the width direction W, and a cross section along the thickness direction T and the width direction W are observed with a scanning electron microscope. Various parameters of the resin electrode layer 13a such as the above-described arithmetic mean roughness Ra of the surface of the second portion 13A of the resin electrode layer 13a are measured from cross-sectional images captured by the scanning electron microscope.

The method of producing an electronic component of the present invention includes: forming a base body which includes a first end surface and a second end surface opposite to each other in a length direction, a first main surface and a second main surface opposite to each other in a thickness direction perpendicular to the length direction, and a first side surface and a second side surface opposite to each other in a width direction perpendicular to the length direction and the thickness direction, a first internal electrode exposed at the first end surface, and a second internal electrode exposed at the second end surface; forming, on the first end surface of the base body, a first external electrode so as to be connected to the first internal electrode by applying a conductive paste containing a conductive component and a resin component by screen printing to form a first resin electrode layer including a first portion facing a whole surface of the first end surface of the base body so that a first plurality of protrusions are arranged periodically side by side on a surface of the first portion, the surface of the first portion being opposite to the first end surface of the base body; and forming, on the second end surface of the base body, a second external electrode so as to be connected to the second internal electrode. As an example of the method of producing an electronic component of the present invention, a method of producing the electronic component of Embodiment 1 of the present invention, that is, a method of producing the electrolytic capacitor 1 shown in FIGS. 1, 2 and the like, is described.

Forming Resin Molding

Forming the resin molding 9 corresponds to forming a base body in the method of producing an electronic component of the present invention.

First, a valve-action metal substrate 3a including a porous portion at a surface thereof, that is, an anode 3 is prepared. Then, the surface of the porous portion is subjected to an anodization treatment to form a dielectric layer 5 on the surface of the porous portion.

Next, a solid electrolyte layer 7a is formed on a surface of the dielectric layer 5 by screen printing or the like. Then, a conductive layer 7b is formed on a surface of the solid electrolyte layer 7a by screen printing or the like. Furthermore, a cathode lead-out layer 7c is formed on a surface of the conductive layer 7b by a method of laminating a metal foil, screen printing, or the like. As a result, a cathode 7 including the solid electrolyte layer 7a, the conductive layer 7b, and the cathode lead-out layer 7c is formed.

As a result, an electrolytic capacitor element 20 including the anode 3, the dielectric layer 5 provided on the surface of the anode 3, and the cathode 7 which faces the anode 3 via the dielectric layer 5 and includes the solid electrolyte layer 7a is produced.

Next, a plurality of electrolytic capacitor elements 20 are laminated to produce a stack 30. Then, the periphery of the stack 30 is sealed with a sealing resin 8 by compression molding or the like to form a resin molding 9.

The resin molding 9 has a substantially rectangular parallelepiped shape, and includes a first end surface 9a and a second end surface 9b opposite to each other in the length direction L, a first main surface 9c and a second main surface 9d opposite to each other in the thickness direction T, and a first side surface 9e and a second side surface 9f opposite to each other in the width direction W.

In the resin molding 9, the anode 3 is exposed at the first end surface 9a, and the cathode 7, in this case, the cathode lead-out layer 7c is exposed at the second end surface 9b.

Forming First External Electrode

First, the first end face 9a of the resin molding 9 is subjected to a plating treatment to form an inner plating layer 11c connected to the anode 3. More specifically, as the inner plating layer 11c, a first inner plating layer 11ca and a second inner plating layer 11cb are formed in order from the anode 3 side.

When forming the first inner plating layer 11ca, it is preferable that the first end surface 9a of the resin molding 9 is subjected to a zincate treatment, and then subjected to a displacement plating treatment using electroless nickel plating to form a nickel plating layer.

For example, when the valve-action metal substrate 3a is an aluminum foil, the surface of the valve-action metal substrate 3a exposed at the first end face 9a of the resin molding 9 is first etched with an acid containing nitric acid as a main component, and then a zinc coating is formed on the surface, thereby performing the zincate treatment. It is preferable to perform both single zincate (pickling) and double zincate (exfoliation) as the zincate treatment. Further, a nickel plating layer is formed as the first inner plating layer 11ca by performing the displacement plating treatment using electroless nickel plating.

When forming the second inner plating layer 11cb, it is preferable that immediately after the formation of the first inner plating layer 11ca, electrolytic silver plating is performed so that the first inner plating layer 11ca does not come into contact with air, thereby forming a silver plating layer.

Next, a conductive paste containing a conductive component and a resin component is applied to the first end surface 9a of the resin molding 9 by screen printing to form a resin electrode layer 11a so as to include a first portion 11A facing the whole surface of the first end surface 9a of the resin molding 9, whereby the first portion 11A of the resin electrode layer 11a is formed so as to cover the inner plating layer 11c. When forming the resin electrode layer 11a, mesh traces during screen printing are caused to appear on a surface of the first portion 11A of the resin electrode layer 11a which is opposite to the first end surface 9a of the resin molding 9. As a result, a plurality of protrusions 15 arranged periodically side by side can be formed on the surface of the first portion 11A of the resin electrode layer 11a which is opposite to the first end surface 9a of the resin molding 9.

For example, the following method may be adopted as a method for causing the mesh traces during screen printing to appear on the surface of the first portion 11A of the resin electrode layer 11a which is opposite to the first end surface 9a of the resin molding 9.

When forming the resin electrode layer 11a, the applied conductive paste is thermally cured. If a drying time (including a resting time) before the thermal curing is shortened or a drying temperature is increased, the mesh traces are likely to appear on a surface of the first portion 11A of the electrode layer 11a which is opposite to the first end surface 9a of the resin molding 9.

When forming the resin electrode layer 11a, if a conductive paste having high thixotropy is applied by screen printing, the applied conductive paste is difficult to be leveled, so that the mesh traces are likely to appear on the surface of the first portion 11A of the resin electrode layer 11a which is opposite to the first end surface 9a of the resin molding 9. From this point of view, the conductive paste for forming the resin electrode layer 11a preferably has a thixotropic index of 1.5 to 10.0, more preferably 1.5 to 7.0, and still more preferably 2.0 to 7.0, particularly preferably 3.0 to 7.0.

The thixotropic index of the conductive paste is determined as follows. First, the viscosity V1 of the conductive paste when a spindle of No. 14 is rotated at 10 rpm at 25° C. is measured with an HB viscometer produced by Brookfield company. Next, the viscosity V2 of the conductive paste when the spindle of No. 14 is rotated at 100 rpm at 25° C. is measured with the same viscometer. The ratio V1/V2 between the viscosity V1 and the viscosity V2 is calculated, and a thus-obtained calculation value is defined as the thixotropic index of the conductive paste.

When forming the resin electrode layer 11a, if a highly viscous conductive paste is applied by screen printing, the applied conductive paste is difficult to be leveled. Therefore, mesh traces are likely to appear on the surface of the first portion 11A of the resin electrode layer 11a which is opposite to the first end surface 9a of the resin molding 9. From this point of view, the conductive paste for forming the resin electrode layer 11a preferably has a viscosity of 25 Pa·s to 400 Pa·s, more preferably 30 Pa·s to 400 Pa·s, still more preferably 50 Pa·s. to 400 Pa·s, particularly preferably 100 Pa·s to 400 Pa·s.

By using the HB viscometer produced by Brookfield company, the viscosity of the conductive paste is measured as a viscosity when the spindle of No. 14 is rotated at 10 rpm at 25° C.

When forming the resin electrode layer 11a, by adjusting the mesh pitch, wire diameter, aperture, etc. of the screen printing plate, it is possible to control various parameters of the resin electrode layer 11a such as the arithmetic mean roughness Ra of the surface of the first portion 11A of the resin electrode layer 11a as described above.

When forming the resin electrode layer 11a, in addition to the first portion 11A, a third portion 11B is formed which extends from the first portion 11A so as to face respective parts of all the surfaces of the first main surface 9c, the second main surface 9d, the first side surface 9e, and the second side surface 9f of the resin molding 9. The conductive paste applied so as to face the whole surface of the first end surface 9a of the resin molding 9 drips so as to face respective parts of all the surfaces of the first main surface 9c, the second main surface 9d, the first side surface 9e, and the second side surface 9f of the resin molding 9, whereby the third portion 11B of the resin electrode layer 11a is formed. The plurality of protrusions 15 are not formed on a surface of the thus-formed third portion 11B of the resin electrode layer 11a which is opposite to the resin molding 9.

When the conductive paste is applied by screen printing, by moving the squeegee along the thickness direction T, in the third portion 11B of the resin electrode layer 11a to be formed, the length in the length direction L of portions which face the first main surface 9c and the second main surface 9d of the resin molding 9 are likely to be larger than the length in the length direction L of portions which face the first side surface 9e and the second side surface 9f of the resin molding 9. Further, by moving the squeegee along the width direction W, in the third portion 11B of the resin electrode layer 11a to be formed, the length in the length direction L of portions which face the first side surface 9e and the second side surface 9f of the resin molding 9 are likely to be larger than the length in the length direction L of portions which face the first main surface 9c and the second main surface 9d of the resin molding 9.

Preferably, the conductive component of the conductive paste for forming the resin electrode layer 11a mainly contains, an element metal such as silver, copper, nickel, or tin or an alloy containing at least one of these metals, for example.

Preferably, the resin component of the conductive paste for forming the resin electrode layer 11a mainly contains an epoxy resin, a phenolic resin, or the like.

The conductive paste for forming the resin electrode layer 11a preferably contains the conductive component of 80% by weight to 97% by weight, and the resin component of 3% by weight to 20% by weight. The conductive paste for forming the resin electrode layer 11a more preferably contains the conductive component of 85% by weight to 95% by weight, and the resin component of 5% by weight to 15% by weight. The conductive paste for forming the resin electrode layer 11a still more preferably contains the conductive component of 90% by weight to 95% by weight, and the resin component of 5% by weight to 10% by weight. The conductive paste for forming the resin electrode layer 11a particularly preferably contains the conductive component of 92% by weight to 95% by weight, and the resin component of 5% by weight to 8% by weight.

The conductive paste for forming the resin electrode layer 11a may contain an organic solvent. Glycol ether organic solvents are preferably used as the organic solvent. Examples of the glycol ether organic solvents include diethylene glycol monobutyl ether and diethylene glycol monophenyl ether.

The conductive paste for forming the resin electrode layer 11a may contain an additive of less than 5% by weight. The additive is useful for adjusting the rheology, especially the thixotropy of the conductive paste.

When forming the resin electrode layer 11a, the first portion 11A facing the whole surface of the first end surface 9a of the resin molding 9 may be formed by applying a conductive paste by sponge transfer printing.

Next, a plating treatment is performed on the resin electrode layer 11a, whereby the outer plating layer 11b is formed so as to be along the surfaces of the plurality of protrusions 15 of the first portion 11A of the resin electrode layer 11a. More specifically, as the outer plating layer 11b, a first outer plating layer 11ba and a second outer plating layer 11bb are formed in order from the resin electrode layer 11a side.

When forming the first outer plating layer 11ba, it is preferable to form a nickel plating layer by performing electrolytic nickel plating on the resin electrode layer 11a.

When forming the second outer plating layer 11bb, it is preferable that immediately after forming the first outer plating layer 11ba, electrolytic tin plating is performed so that the first outer plating layer 11ba does not come into contact with air, thereby forming a tin plating layer.

As a result, the first external electrode 11 connected to the anode 3 exposed at the first end surface 9a is formed on the first end surface 9a of the resin molding 9. More specifically, the first external electrode 11 including the inner plating layer 11c, the resin electrode layer 11a, and the outer plating layer 11b in the stated order from the anode 3 side is formed.

Forming Second External Electrode

First, a plating treatment is performed on the second end surface 9b of the resin molding 9 to form an inner plating layer 13c connected to the cathode 7, in this case, the cathode lead-out layer 7c. More specifically, as the inner plating layer 13c, a first inner plating layer 13ca and a second inner plating layer 13cb are formed in order from the cathode 7 side.

When forming the first inner plating layer 13ca, it is preferable that a nickel plating layer is formed on the second end surface 9b of the resin molding 9 by the same method as the first inner plating layer 11ca, but the zincate treatment may not be performed. However, when the cathode lead-out layer 7c contains aluminum as a main component, it is preferable to perform the zincate treatment.

When forming the second inner plating layer 13cb, it is preferable that immediately after forming the first inner plating layer 13ca, electrolytic silver plating is performed so that the first inner plating layer 13ca does not come into contact with air, thereby forming a silver plating layer.

Next, a conductive paste containing a conductive component and a resin component is applied to the second end surface 9b of the resin molding 9 by screen printing so that a resin electrode layer 13a is formed so as to include a second portion 13A facing the whole surface of the second end surface 9b of the resin molding 9. As a result, the second portion 13A of the resin electrode layer 13a is formed so as to cover the inner plating layer 13c. When forming the resin electrode layer 13a, the mesh traces during screen printing are caused to appear on a surface of the second portion 13A of the resin electrode layer 13a which is opposite to the second end surface 9b of the resin molding 9. As a result, a plurality of protrusions 16 arranged periodically side by side can be formed on the surface of the second portion 13A of the resin electrode layer 13a which is opposite to the second end surface 9b of the resin molding 9.

Examples of a method for causing the mesh traces during screen printing to appear on the surface of the second portion 13A of the resin electrode layer 13a which is opposite to the second end surface 9b of the resin molding 9 include the following method.

When forming the resin electrode layer 13a, the applied conductive paste is thermally cured. If the drying time (including a resting time) before thermal curing is shortened or a drying temperature is increased, the mesh traces are likely to appear on the surface of the second portion 13A of the resin electrode layer 13a which is opposite to the second end surface 9b of the resin molding 9.

When forming the resin electrode layer 13a, if a conductive paste having high thixotropy is applied by screen printing, the applied conductive paste is difficult to be leveled, so that mesh traces are likely to appear on the surface of the second portion 13A of the resin electrode layer 13a which is opposite to the second end surface 9b of the resin molding 9. From this point of view, the conductive paste for forming the resin electrode layer 13a preferably has a thixotropic index of 1.5 to 10.0, more preferably 1.5 to 7.0, and still more preferably 2.0 to 7.0, particularly preferably 3.0 to 7.0.

When forming the resin electrode layer 13a, if a conductive paste having high viscosity is applied by screen printing, the applied conductive paste is difficult to be leveled, so that the mesh traces are likely to appear on the surface of the second portion 13A of the resin electrode layer 13a which is opposite to the second end surface 9b of the resin molding 9. From this point of view, the conductive paste for forming the resin electrode layer 13a preferably has a viscosity of 25 Pa·s to 400 Pa·s, more preferably 30 Pa·s to 400 Pa·s, still more preferably 50 Pa·s to 400 Pa·s, particularly preferably 100 Pa·s to 400 Pa·s.

When forming the resin electrode layer 13a, by adjusting the mesh pitch, wire diameter, aperture, etc. of the screen printing plate, it is possible to control various parameters of the resin electrode layer 13a such as the arithmetic mean roughness Ra of the surface of the second portion 13A of the resin electrode layer 13a as described above.

When forming the resin electrode layer 13a, in addition to the second portion 13A, a fourth portion 13B is formed which extends from the second portion 13A so as to face respective parts of all the surfaces of the first main surface 9c, the second main surface 9d, the first side surface 9e, and the second side surface 9f of the resin molding 9. The conductive paste applied so as to face the whole surface of the second end surface 9b of the resin molding 9 drips so as to face respective parts of all the surfaces of the first main surface 9c, the second main surface 9d, the first side surface 9e, and the second side surface 9f of the resin molding 9, whereby the fourth portion 13B of the resin electrode layer 13a is formed. The plurality of protrusions 16 are not formed on a surface of the thus-formed fourth portion 13B of the resin electrode layer 13a which is opposite to the resin molding 9.

When the conductive paste is applied by screen printing, by moving the squeegee along the thickness direction T, in the fourth portion 13B of the resin electrode layer 13a to be formed, the lengths in the length direction L of portions which face the first main surface 9c and the second main surface 9d of the resin molding 9 are likely to be larger than the lengths in the length direction L of portions which face the first side surface 9e and the second side surface 9f of the resin molding 9. Further, by moving the squeegee along the width direction W, in the fourth portion 13B of the resin electrode layer 13a to be formed, the lengths in the length direction L of portions which face the first side surface 9e and the second side surface 9f of the resin molding 9 are likely to be larger than the lengths in the length direction L of portions which face the first main surface 9c and the second main surface 9d of the resin molding 9.

Preferably, the conductive component of the conductive paste for forming the resin electrode layer 13a mainly contains, an element metal such as silver, copper, nickel, or tin or an alloy containing at least one of these metals, for example.

Preferably, the resin component of the conductive paste for forming the resin electrode layer 13a mainly contains an epoxy resin, a phenolic resin, or the like.

The conductive paste for forming the resin electrode layer 13a preferably contains the conductive component of 80% by weight to 97% by weight, and the resin component of 3% by weight to 20% by weight. The conductive paste for forming the resin electrode layer 13a more preferably contains the conductive component of 85% by weight to 95% by weight, and the resin component of 5% by weight to 15% by weight. The conductive paste for forming the resin electrode layer 13a still more preferably contains the conductive component of 90% by weight to 95% by weight, and the resin component of 5% by weight to 10% by weight. The conductive paste for forming the resin electrode layer 13a particularly preferably contains the conductive component of 92% by weight to 95% by weight, and the resin component of 5% by weight to 8% by weight.

The conductive paste for forming the resin electrode layer 13a may contain an organic solvent. Glycol ether organic solvent are preferably used as the organic solvent. Examples of the glycol ether organic solvents include diethylene glycol monobutyl ether and diethylene glycol monophenyl ether.

The conductive paste for forming the resin electrode layer 13a may contain an additive of less than 5% by weight.

When forming the resin electrode layer 13a, the second portion 13A facing the whole surface of the second end surface 9b of the resin molding 9 may be formed by applying a conductive paste by sponge transfer printing.

Next, a plating treatment is performed on the resin electrode layer 13a, whereby the outer plating layer 13b is formed so as to be along the surfaces of the plurality of protrusions 16 of the second portion 13A of the resin electrode layer 13a. More specifically, as the outer plating layer 13b, a first outer plating layer 13ba and a second outer plating layer 13bb are formed in order from the resin electrode layer 13a side.

When forming the first outer plating layer 13ba, it is preferable to form a nickel plating layer by performing electrolytic nickel plating on the resin electrode layer 13a.

When forming the second outer plating layer 13bb, it is preferable that immediately after forming the first outer plating layer 13ba, electrolytic tin plating is performed so that the first outer plating layer 13ba does not come into contact with air, thereby forming a tin plating layer.

As a result, the second external electrode 13 connected to the cathode 7 exposed at the second end face 9b is formed on the second end surface 9b of the resin molding 9. More specifically, the second external electrode 13 including the inner plating layer 13c, the resin electrode layer 13a, and the outer plating layer 13b in the stated order from the cathode 7 side is formed.

Forming the first external electrode and forming the second external electrode may be performed separately or simultaneously. When these steps are performed separately, the order is not limited.

Thus, the electrolytic capacitor 1 shown in FIGS. 1, 2, etc. is produced.

In the electrolytic capacitor 1, the first external electrode 11 is connected to the anode 3, and the second external electrode 13 is connected to the cathode 7. As a modification, the first external electrode 11 may be connected to the cathode 7, and the second external electrode 13 may be connected to the anode 3. In this case, it is only required that the anode 3 is exposed at the second end surface 9b of the resin molding 9 and the cathode 7 is exposed at the first end surface 9a of the resin molding 9.

Embodiment 2

In an electronic component of the present invention, the base body may be formed of a stack including at least one ceramic layer selected from the group consisting of a dielectric ceramic layer, a magnetic ceramic layer, a piezoelectric ceramic layer, and a semiconductor ceramic layer, the first internal electrode layer and the second internal electrode layer. Such an electronic component corresponds to a multilayer ceramic electronic component such as a multilayer ceramic capacitor, a multilayer coil, a multilayer thermistor, a multilayer varistor, a multilayer LC filter, or a multilayer piezoelectric filter. In the following description, the multilayer ceramic capacitor out of the examples of the multilayer ceramic electronic component will be described as an electronic component of Embodiment 2 of the present invention. The electronic component of Embodiment 2 of the present invention is the same as the electronic component of Embodiment 1 of the present invention except that the configurations of the base body and the internal electrode are different.

Figure 6:
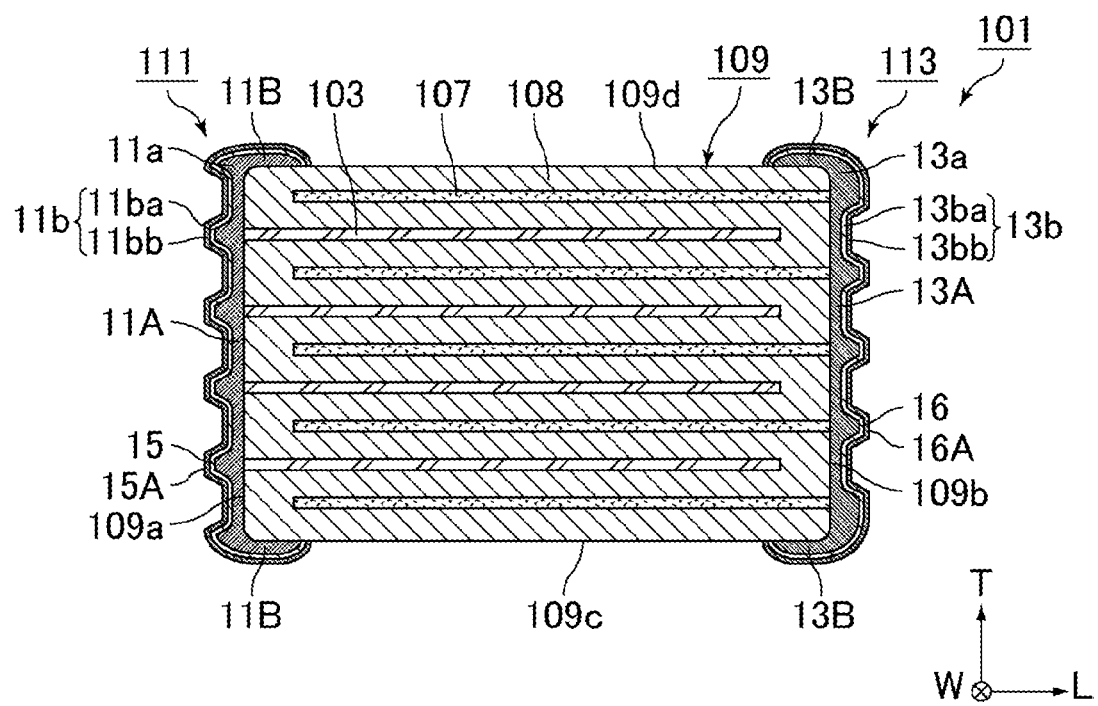
FIG. 6 is a schematic cross-sectional view showing an electronic component of Embodiment 2 of the present invention.

FIG. 6 is a schematic cross-sectional view showing the electronic component of Embodiment 2 of the present invention.

As shown in FIG. 6, a multilayer ceramic capacitor 101 includes a stack 109, a first external electrode 111, and a second external electrode 113.

The stack 109 corresponds to the base body in the electronic component of the present invention.

The stack 109 has a substantially rectangular parallelepiped shape, and includes a first end surface 109a and a second end surface 109b opposite to each other in a length direction L, a first main surface 109c and a second main surface 109d opposite to each other in a thickness direction T, and a first side surface and a second side surface (not shown) opposite to each other in a width direction W.

The first end surface 109a and the second end surface 109b of the stack 109 are not required to be strictly perpendicular to the length direction L. Moreover, the first main surface 109c and the second main surface 109d of the stack 109 are not required to be strictly perpendicular to the thickness direction T. Furthermore, the first side surface and the second side surface of the stack 109 are not required to be strictly perpendicular to the width direction W.

The stack 109 includes a stack of a first internal electrode layer 103, a second internal electrode layer 107, and a dielectric ceramic layer 108.

The first internal electrode layer 103 and the second internal electrode layer 107 correspond to the first internal electrode and the second internal electrode in the electronic component of the present invention, respectively.

Each of the first internal electrode layer 103 and the second internal electrode layer 107 is preferably a nickel electrode layer containing nickel as a main component of a conductive component.

Each of the first internal electrode layer 103 and the second internal electrode layer 107 may be a silver electrode layer containing silver as the main component of the conductive component, a copper electrode layer containing copper as the main component of the conductive component, or a palladium electrode layer containing palladium as the main component of the conductive component.

Each of the first internal electrode layer 103 and the second internal electrode layer 107 is formed, for example, by applying a conductive paste including a conductive component containing nickel, silver, copper, palladium or the like as a main component by screen printing or the like.

The first internal electrode layer 103 is exposed at the first end surface 109a of the stack 109 and connected to the first external electrode 111.

The second internal electrode layer 107 is exposed at the second end surface 109b of the stack 109 and connected to the second external electrode 113.

The dielectric ceramic layer 108 contains, for example, dielectric ceramic such as barium titanate.

The dielectric ceramic layer 108 is formed, for example, by performing sheet-molding using dielectric slurry containing a dielectric ceramic and an organic solvent.

The first external electrode 111 is provided on the first end surface 109a of the stack 109. The first external electrode 111 may extend from the first end surface 109a of the stack 109 to a part of each surface in at least one surface selected from the group consisting of the first main surface 109c, the second main surface 109d, the first side surface, and the second side surface.

The first external electrode 111 is connected to the first internal electrode layer 103 exposed at the first end surface 109a of the stack 109.

The first external electrode 111 has the same configuration as the first external electrode 11 except that it does not include the inner plating layer 11c. The form of the first external electrode 111, particularly the form of the resin electrode layer 11a is also the same as described above.

The second external electrode 113 is provided on the second end surface 109b of the stack 109. The second external electrode 113 may extend from the second end surface 109b of the stack 109 to a part of each surface in at least one surface selected from the group consisting of the first main surface 109c, the second main surface 109d, the first side surface, and the second side surface.

The second external electrode 113 is connected to the second internal electrode layer 107 exposed at the second end surface 109b of the stack 109.

The second external electrode 113 has the same configuration as the second external electrode 13 except that it does not include the inner plating layer 13c. The form of the second external electrode 113, particularly the form of the resin electrode layer 13a is also the same as described above.

A method of producing an electronic component of Embodiment 2 of the present invention, that is, a method of producing the multilayer ceramic capacitor 101 shown in FIG. 6 is the same as the method of producing the electronic component of Embodiment 1 of the present invention except that the stack 109 is formed instead of the resin molding 9, the inner plating layer 11c is not formed in forming the first external electrode and the inner plating layer 13c is not formed in forming the second external electrode.

A method known in the field of multilayer ceramic capacitors can be used in forming the stack 109.

In the multilayer ceramic capacitor 101, the first external electrode 111 is connected to the first internal electrode layer 103, and the second external electrode 113 is connected to the second internal electrode layer 107. As a modification, the first external electrode 111 may be connected to the second internal electrode layer 107, and the second external electrode 113 may be connected to the first internal electrode layer 103. In this case, it is only required that the first internal electrode layer 103 is exposed at the second end surface 109b of the stack 109, and the second internal electrode layer 107 is exposed at the first end surface 109a of the stack 109.

Embodiment 3

When the electronic component of the present invention is a multilayer ceramic electronic component, the first external electrode may further include a baked electrode layer provided between the base body and the resin electrode layer. The second external electrode may further include a baked electrode layer provided between the base body and the resin electrode layer. In the following description, a multilayer ceramic capacitor out of such examples of the multilayer ceramic electronic component will be described as an electronic component of Embodiment 3 of the present invention. The electronic component of Embodiment 3 of the present invention is the same as the electronic component of Embodiment 2 of the present invention except that it includes a baked electrode layer.

Figure 7:
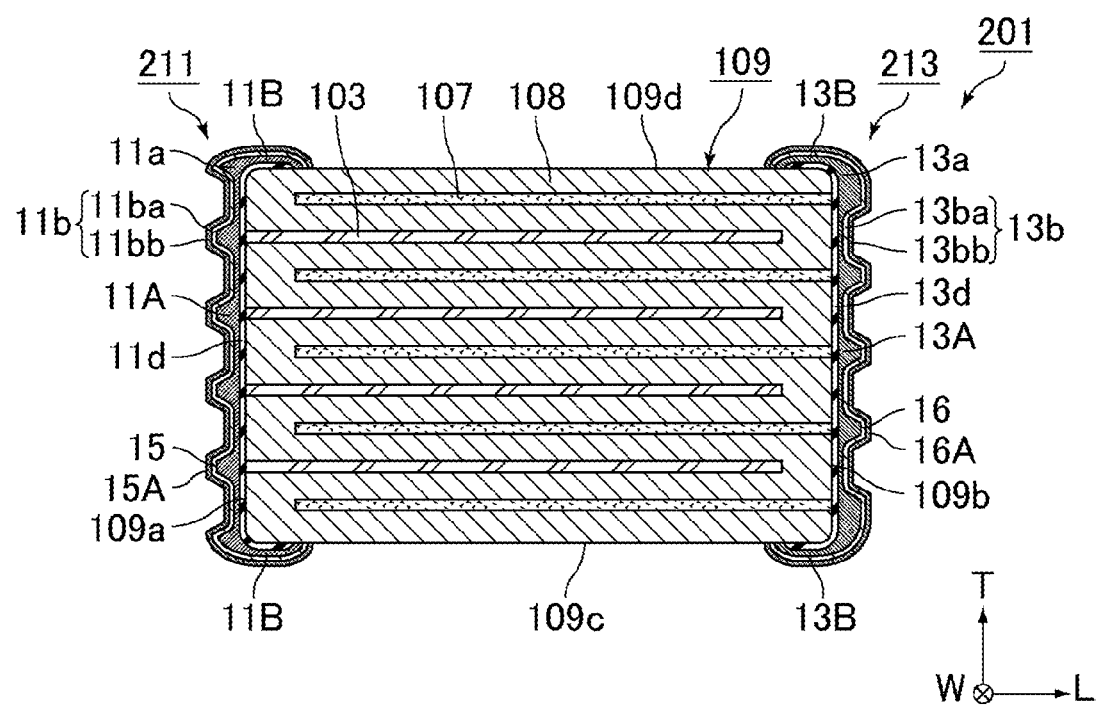
FIG. 7 is a schematic cross-sectional view showing an electronic component of Embodiment 3 of the present invention.

FIG. 7 is a schematic cross-sectional view showing an electronic component of Embodiment 3 of the present invention.

As shown in FIG. 7, a multilayer ceramic capacitor 201 includes a stack 109, a first external electrode 211, and a second external electrode 213.

The first external electrode 211 is provided on a first end surface 109a of the stack 109. The first external electrode 211 may extend from the first end surface 109a of the stack 109 to a part of each surface in at least one surface selected from the group consisting of a first main surface 109c, a second main surface 109d, a first side surface, and a second side surface.

The first external electrode 211 is connected to a first internal electrode layer 103 exposed at the first end surface 109a of the stack 109.

The first external electrode 211 further includes a baked electrode layer 11d provided between the stack 109 and a resin electrode layer 11a.

The baked electrode layer 11d may be provided not only between the stack 109 and a first portion 11A of the resin electrode layer 11a, but also between the stack 109 and a third portion 11B of the resin electrode layer 11a.

The second external electrode 213 is provided on a second end surface 109b of the stack 109. The second external electrode 213 may extend from the second end surface 109b of the stack 109 to a part of each surface in at least one surface selected from the group consisting of the first main surface 109c, the second main surface 109d, the first side surface, and the second side surface.

The second external electrode 213 is connected to a second internal electrode layer 107 exposed at the second end surface 109b of the stack 109.

The second external electrode 213 further includes a baked electrode layer 13d provided between the stack 109 and the resin electrode layer 13a.

The baked electrode layer 13d may be provided not only between the stack 109 and a second portion 13A of the resin electrode layer 13a, but also between the stack 109 and a fourth portion 13B of the resin electrode layer 13a.

Each of the baked electrode layer 11d and the baked electrode layer 13d is preferably a baked copper electrode layer containing copper as a main component of a conductive component.

Each of the baked electrode layer 11d and the baked electrode layer 13d may be a baked silver electrode layer containing silver as the main component of the conductive component, or may be a baked nickel electrode layer containing nickel as the main component of the conductive component.

Each of the baked electrode layer 11d and the baked electrode layer 13d may contain glass.

Each of the baked electrode layer 11d and the baked electrode layer 13d is formed, for example, by applying a conductive paste including a conductive component containing copper, silver, nickel or the like as a main component by screen printing or the like, and then baking the applied conductive paste.

A method of producing an electronic component of Embodiment 3 of the present invention, that is, a method of producing a multilayer ceramic capacitor 201 shown in FIG. 7 is the same as the method of producing the electronic component of Embodiment 2 of the present invention except that the baked electrode layer 11d is formed in forming the first external electrode and the baked electrode layer 13d is formed in forming the second external electrode.

In forming the first external electrode, before forming the resin electrode layer 11a, the conductive paste is applied to the first end surface 109a of the stack 109 by screen printing or the like, and then baked to form the baked electrode layer 11d.

When forming the baked electrode layer 11d, the baking temperature is preferably set to 700° C. to 900° C. Further, it is preferable to perform the baking in a non-oxidizing atmosphere.

The conductive component of the conductive paste for forming the baked electrode layer 11d preferably contains copper as a main component. The conductive component of the conductive paste for forming the baked electrode layer 11d may contain silver, nickel, or the like as a main component.

In forming the second external electrode, before forming the resin electrode layer 13a, the conductive paste is applied to the second end surface 109b of the stack 109 by screen printing or the like and then baked to form the baked electrode layer 13d.

When forming the baked electrode layer 13d, the baking temperature is preferably set to 700° C. to 900° C. Further, it is preferable to perform the baking in a non-oxidizing atmosphere.

The conductive component of the conductive paste for forming the baked electrode layer 13d preferably contains copper as a main component. The conductive component of the conductive paste for forming the baked electrode layer 13d may contain silver, nickel, or the like as a main component.

In the multilayer ceramic capacitor 201, the first external electrode 211 is connected to the first internal electrode layer 103, and the second external electrode 213 is connected to the second internal electrode layer 107. As a modification, the first external electrode 211 may be connected to the second internal electrode layer 107, and the second external electrode 213 may be connected to the first internal electrode layer 103. In this case, it is only required that the first internal electrode layer 103 is exposed at the second end surface 109b of the stack 109, and the second internal electrode layer 107 is exposed at the first end surface 109a of the stack 109.

EXAMPLES

Examples that more specifically disclose the electronic component of the present invention are described below. In the following examples, an electrolytic capacitor is described as the electronic component of the present invention. The present invention is not limited to these examples.

Example 1

An electrolytic capacitor of Example 1 was produced by the following method.
Forming Resin Molding
A resin molding having the structure shown in FIG. 2 was formed by sealing the periphery of a stack of an electrolytic capacitor element with a sealing resin.
Forming First External Electrode
First, a zincate treatment was performed by etching a surface of a valve-action metal substrate exposed at a first end surface of a resin molding with an acid containing nitric acid as a main component, and then forming a zinc coating on the surface of the valve-action metal substrate. Thereafter, electroless nickel plating and electrolytic silver plating were sequentially performed on the first end surface of the resin molding to form an inner plating layer having a two-layer structure of a nickel plating layer and a silver plating layer.

Next, after applying a silver paste by screen printing, the applied silver paste was thermally cured at a heat treatment temperature (for example, 150° C. to 200° C.) suitable for the silver paste, whereby a resin electrode layer was formed so as to include a first portion facing the whole surface of the first end surface of the resin molding while covering the inner plating layer. A plurality of protrusions were arranged periodically side by side due to mesh traces caused during screen printing on a surface of the first portion of the resin electrode layer which was opposite to the first end surface of the resin molding.

The silver paste for forming the resin electrode layer had a thixotropic index of 1.5 and a viscosity of 31 Pa·s.

Next, the resin electrode layer was subjected to electrolytic nickel plating and electrolytic tin plating in the stated order, whereby an outer plating layer having a two-layer structure of a nickel plating layer and a tin plating layer was formed along the surfaces of the plurality of protrusions of the first portion of the resin electrode layer.

In this way, the first external electrode including the inner plating layer, the resin electrode layer, and the outer plating layer in the stated order from the anode side was formed.
Forming Second External Electrode First, a zincate treatment was performed by etching a surface of a cathode lead-out layer exposed at a second end surface of a resin molding with an acid containing nitric acid as a main component, and then forming a zinc coating on the surface of the cathode lead-out layer. Thereafter, electroless nickel plating and electrolytic silver plating were sequentially performed on the second end surface of the resin molding to form an inner plating layer having a two-layer structure of a nickel plating layer and a silver plating layer.

Next, after applying a silver paste by screen printing, the applied silver paste was thermally cured at a heat treatment temperature (for example, 150° C. to 200° C.) suitable for the silver paste, whereby a resin electrode layer was formed so as to include a first portion facing the whole surface of the second end surface of the resin molding while covering the inner plating layer. A plurality of protrusions were arranged periodically side by side due to mesh traces caused during screen printing on a surface of the first portion of the resin electrode layer which was opposite to the second end surface of the resin molding.

The silver paste for forming the resin electrode layer had a thixotropic index of 1.5 and a viscosity of 31 Pa·s.

Next, the resin electrode layer was subjected to electrolytic nickel plating and electrolytic tin plating in the stated order, whereby an outer plating layer having a two-layer structure of a nickel plating layer and a tin plating layer was formed along the surfaces of the plurality of protrusions of the first portion of the resin electrode layer.

In this way, the second external electrode including the inner plating layer, the resin electrode layer, and the outer plating layer in the stated order from the cathode side was formed.

Thus, the electrolytic capacitor of Example 1 was produced.

Examples 2 to 13

Electrolytic capacitors of Examples 2 to 13 were produced in the same manner as used for the electrolytic capacitor of Example 1 except that the thixotropic index and viscosity of the silver paste for forming the resin electrode layer used in forming the first external electrode and forming the second external electrode were changed as shown in Table 1.

Comparative Example 1

An electrolytic capacitor of Comparative Example 1 was produced in the same manner as used for the electrolytic capacitor of Example 2 except that the resin electrode layer was formed by applying a silver paste by immersion coating in forming the first external electrode and forming the second external electrode.

Evaluation

The electrolytic capacitors of Examples 1 to 13 and Comparative Example 1 were evaluated as follows. Table 1 shows the results.

Appearance

For the electrolytic capacitor of each Example, the appearances of the first external electrode and the second external electrode were visually confirmed. Evaluation criteria were as follows.

Excellent: It was possible to very clearly confirm a state in which a plurality of protrusions were arranged periodically side by side.

Good: It was possible to clearly confirm a state in which a plurality of protrusions were arranged periodically side by side.

Acceptable: It was possible to confirm a state in which a plurality of protrusions were arranged periodically side by side.

Poor: It was not possible to confirm existence of a plurality of protrusions or it was not possible to confirm a state in which a plurality of protrusions were arranged periodically side by side although the plurality of protrusions existed.

Bonding Strength

The electrolytic capacitor of each Example was mounted on a wiring board via solder. Then, the bonding strength of the solder to the first external electrode and the second external electrode was measured by using a bond tester "DAGE 4000 Optima" manufactured by Nordson company. With respect to conditions for measuring the bonding strength, a tool speed was set to 100.0 μm/s, a tool movement amount was set to 100 μm, and a test height was set to 500 μm.

TABLE 1

| | Specifications Silver paste for forming resin electrode layer | | | Evaluation | |
|---|---|---|---|---|---|
| | Application method | Thixotropic index | Viscosity (Pa · s) | Appearance | Bonding strength (N) |
| Example 1 | Screen printing | 1.5 | 31 | Acceptable | 68 |
| Example 2 | Screen printing | 1.8 | 35 | Acceptable | 70 |
| Example 3 | Screen printing | 2.0 | 31 | Good | 75 |
| Example 4 | Screen printing | 2.5 | 33 | Good | 78 |
| Example 5 | Screen printing | 2.8 | 35 | Good | 83 |
| Example 6 | Screen printing | 3.0 | 31 | Excellent | 90 |
| Example 7 | Screen printing | 5.0 | 33 | Excellent | 93 |
| Example 8 | Screen printing | 7.0 | 35 | Excellent | 98 |
| Example 9 | Screen printing | 1.5 | 50 | Good | 81 |
| Example 10 | Screen printing | 1.8 | 100 | Good | 85 |
| Example 11 | Screen printing | 1.8 | 200 | Good | 87 |
| Example 12 | Screen printing | 2.0 | 300 | Excellent | 91 |
| Example 13 | Screen printing | 7.0 | 400 | Excellent | 105 |
| Comparative Example 1 | Immersion coating | 1.8 | 35 | Poor | 55 |

As shown in Table 1, in the electrolytic capacitors of Examples 1 to 13 in which the silver paste for forming the resin electrode layer was applied by screen printing, a plurality of protrusions caused by mesh traces during screen printing were arranged periodically side by side at the first external electrode and the second external electrode. Therefore, in the electrolytic capacitors of Examples 1 to 13, the bonding strength of the solder to the first external electrode and the second external electrode was high. In other words, with respect to the electrolytic capacitors of Examples 1 to 13, it was found that the adhesion between the first external electrode and the solder and the adhesion between the second external electrode and the solder were enhanced when each electrolytic capacitor was mounted on the wiring board via the solder.

Among the electrolytic capacitors of Examples 1 to 13, focusing on the electrolytic capacitors of Example 2, Example 5, and Example 8 in which the viscosity of the silver paste for forming the resin electrode layer was the same, it was found that mesh traces during screen printing was more likely to appear at the first external electrode and the second external electrode and thus the bonding strength of the solder to the first external electrode and the second external electrode was enhanced as the thixotropic index of the silver paste for forming the resin electrode layer increased.

Among the electrolytic capacitors of Examples 1 to 13, focusing on the electrolytic capacitors of Example 2, Example 10, and Example 11 in which the thixotropic index of the silver paste for forming the resin electrode layer was the same, it was found that mesh traces during screen printing was more likely to appear at the first external electrode and the second external electrode and thus the bonding strength of the solder to the first external electrode and the second external electrode was enhanced when the viscosity of the silver paste for forming the resin electrode layer increased greatly.

On the other hand, in the electrolytic capacitor of Comparative Example 1 in which the silver paste for forming the resin electrode layer was applied by immersion coating, a plurality of protrusions were not present at the first external electrode and the second external electrode. Therefore, in the electrolytic capacitor of Comparative Example 1, the bonding strength of the solder to the first external electrode and the second external electrode was lower than those of the electrolytic capacitors of Examples 1 to 13.

REFERENCE SIGNS LIST 1 electrolytic capacitor
3 anode
3a valve-action metal substrate
5 dielectric layer
7 cathode
7a solid electrolyte layer
7b conductive layer
7c cathode lead-out layer
8 sealing resin
9 resin molding
9a, 109a first end surface
9b, 109b second end surface
9c, 109c first main surface
9d, 109d second main surface
9e first side surface
9f second side surface
11, 111, 211 first external electrode
11a, 13a resin electrode layer
11b, 13b outer plating layer
11ba, 13ba first outer plating layer
11bb, 13bb second outer plating layer
11c, 13c inner plating layer
11ca, 13ca first inner plating layer
11cb, 13cb second inner plating layer
11d, 13d baked electrode layer
11A first portion
13A second portion
11Aa, 13Aa bottom surface
11Ab, 13Ab top surface
11B third portion
13B fourth portion
13, 113, 213 second external electrode
15, 15A, 16, 16A Protrusion
20 electrolytic capacitor element
30, 109 stack
50 wiring board
51 printing board
52, 53 land electrode
54 conductive bonding material
101, 201 multilayer ceramic capacitor
103 first internal electrode layer
107 second internal electrode layer
108 dielectric ceramic layer
L length direction
La shortest distance in length direction between bottom surface and first end surface
Lb shortest distance in length direction between bottom surface and second end surface
T thickness direction
Taa, Tab length in thickness direction of bottom surface
Tba, Tbb length in thickness direction of top surface
Tpa, Tpb shortest distance in thickness direction between top surfaces
W width direction

The invention claimed is:

1. An electronic component comprising:
a base body which includes a first end surface and a second end surface opposite to each other in a length direction, a first main surface and a second main surface opposite to each other in a thickness direction perpendicular to the length direction, and a first side surface and a second side surface opposite to each other in a width direction perpendicular to the length direction and the thickness direction, a first internal electrode exposed at the first end surface, and a second internal electrode exposed at the second surface;
a first external electrode on the first end surface and connected to the first internal electrode; and
a second external electrode on the second end surface and connected to the second internal electrode,
wherein the first external electrode includes a first resin electrode layer containing a conductive component and a resin component,
the first resin electrode layer of the first external electrode includes a first portion facing a whole surface of the first end surface of the base body,
a first plurality of protrusions are arranged periodically side by side on a surface of the first portion of the first resin electrode layer of the first external electrode, the surface of the first portion being opposite to the first end surface of the base body, and
wherein when viewing a cross section along the length direction and the thickness direction, in the first external electrode, a surface of the first portion of the first resin electrode layer has an arithmetic mean roughness Ra defined by JIS B 0601:2013 of 20 μm to 100 μm.

2. The electronic component according to claim 1, wherein the first external electrode further includes an outer plating layer along surfaces of the first plurality of protrusions of the first portion of the first resin electrode layer.

3. The electronic component according to claim 1, wherein the first resin electrode layer of the first external electrode further includes a third portion that extends from the first portion so as to face a part of at least one surface selected from the group consisting of the first main surface, the second main surface, the first side surface, and the second side surface of the base body, and the first plurality of protrusions of the first external electrode are not provided on a surface of the third portion of the first resin electrode layer of the first external electrode, the surface of the third portion being opposite to the base body.

4. The electronic component according to claim 1, wherein the second external electrode includes a second resin electrode layer containing a conductive component and a resin component, the second resin electrode layer of the second external electrode includes a second portion facing a whole surface of the second end surface of the base body, and a second plurality of protrusions are arranged periodically side by side on a surface of the second portion of the second resin electrode layer of the second external electrode, the surface of the second portion being opposite to the second end surface of the base body.

5. The electronic component according to claim 4, wherein the second external electrode further includes an outer plating layer along surfaces of the plurality of protrusions of the second portion of the second resin electrode layer.

6. The electronic component according to claim 4, wherein the second resin electrode layer of the second external electrode further includes a fourth portion that extends from the second portion so as to face a part of at least one surface selected from the group consisting of the first main surface, the second main surface, the first side surface, and the second side surface of the base body, and the second plurality of protrusions of the second external electrode are not provided on a surface of the fourth portion of the second resin electrode layer of the second external electrode, the surface of the fourth portion being opposite to the base body.

7. The electronic component according to claim 1, wherein the base body is formed of a resin molding including an electrolytic capacitor element, and a sealing resin sealing a periphery of the electrolytic capacitor element, the electrolytic capacitor element includes an anode, a dielectric layer on a surface of the anode, and a cathode facing the anode via the dielectric layer and including an electrolyte layer, and the first internal electrode is one of the anode or the cathode.

8. The electronic component according to claim 1, wherein the base body is a stack including at least one ceramic layer selected from the group consisting of a dielectric ceramic layer, a magnetic ceramic layer, a piezoelectric ceramic layer, and a semiconductor ceramic layer, the first internal electrode layer and the second internal electrode layer.

9. An electronic component comprising:

a base body which includes a first end surface and a second end surface opposite to each other in a length direction, a first main surface and a second main surface opposite to each other in a thickness direction perpendicular to the length direction, and a first side surface and a second side surface opposite to each other in a width direction perpendicular to the length direction and the thickness direction, a first internal electrode exposed at the first end surface, and a second internal electrode exposed at the second surface;

a first external electrode on the first end surface and connected to the first internal electrode; and a second external electrode on the second end surface and connected to the second internal electrode, wherein the first external electrode includes a first resin electrode layer containing a conductive component and a resin component, the first resin electrode layer of the first external electrode includes a first portion facing a whole surface of the first end surface of the base body, and a first plurality of protrusions are arranged periodically side by side on a surface of the first portion of the first resin electrode layer of the first external electrode, the surface of the first portion being opposite to the first end surface of the base body, and wherein when viewing a cross section along the length direction and the thickness direction, in the first external electrode, bottom surfaces located in respective gaps between the first plurality of protrusions and top surfaces of the first plurality of protrusions are present on a surface of the first portion of the first resin electrode layer.

10. The electronic component according to claim 9, wherein a length in the thickness direction of the bottom surface is 50 μm to 200 μm.

11. The electronic component according to claim 9, wherein a shortest distance in the thickness direction between the top surfaces of two adjacent protrusions of the first plurality of protrusions is 50 μm to 100 μm.

12. The electronic component according to claim 9, wherein a shortest distance in the thickness direction between the top surfaces of two adjacent protrusions of the first plurality of protrusions is larger than a length in the thickness direction of the bottom surface.

13. The electronic component according to claim 9, wherein a length in the thickness direction of the top surface is 10 μm to 100 μm.

14. The electronic component according to claim 9, wherein a length in the thickness direction of the bottom surface is larger than a length in the thickness direction of the top surface.

15. A method of producing an electronic component, the method comprising:

forming a base body which includes a first end surface and a second end surface opposite to each other in a length direction, a first main surface and a second main surface opposite to each other in a thickness direction perpendicular to the length direction, and a first side surface and a second side surface opposite to each other in a width direction perpendicular to the length direction and the thickness direction, a first internal electrode exposed at the first end surface, and a second internal electrode exposed at the second end surface;

forming, on the first end surface of the base body, a first external electrode so as to be connected to the first internal electrode by applying a conductive paste containing a conductive component and a resin component by screen printing to form a first resin electrode layer including a first portion facing a whole surface of the first end surface of the base body so that a first plurality of protrusions are arranged periodically side by side on a surface of the first portion, the surface of the first portion being opposite to the first end surface of the base body; and forming, on the second end surface of the base body, a second external electrode so as to be connected to the second internal electrode.

16. The method of producing an electronic component according to claim 15, wherein the second external electrode is formed by applying a conductive paste containing a conductive component and a resin component by screen printing to form a second resin electrode layer including a second portion facing a whole surface of the second end surface of the base body so that a second plurality of protrusions are arranged periodically side by side on a surface of the second portion, the surface of the second portion being opposite to the second end surface of the base body.

17. The method of producing an electronic component according to claim 15, wherein the conductive paste has a thixotropic index of 1.5 to 10.0.

18. The method of producing an electronic component according to claim 15, wherein the conductive paste has a viscosity of 25 Pa·s to 400 Pa·s.

* * * * *